(12) United States Patent
Kyojima et al.

(10) Patent No.: US 6,275,936 B1
(45) Date of Patent: Aug. 14, 2001

(54) DECRYPTION METHOD AND DEVICE, AND ACCESS RIGHT AUTHENTICATION METHOD AND APPARATUS

(75) Inventors: Masaki Kyojima; Rumiko Kakehi; Koji Takeda; Taro Terao, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/173,186

(22) Filed: Oct. 15, 1998

(30) Foreign Application Priority Data

Oct. 17, 1997 (JP) .................................................. 9-285302

(51) Int. Cl.[7] ...................................................... G06F 1/24
(52) U.S. Cl. ........................... 713/182; 713/161; 713/168
(58) Field of Search ................................. 713/161, 166, 713/168, 169, 170, 176, 182

(56) References Cited

FOREIGN PATENT DOCUMENTS 10-247905    9/1998   (JP) .

OTHER PUBLICATIONS

Micali, Silvio, "Fair Public–Key Cryptosystems", Laboratory for Computer Science, Massachusetts Institute for Technology, Cambridge, MA, pp. 113–138, 1993.

*Primary Examiner*—Thomas R. Peeso
(74) *Attorney, Agent, or Firm*—Oliff & Berridge, PLC

(57) ABSTRACT

A decryption method and device, an access right authentication method and apparatus for securely transmitting specific information to the decryption device while retaining blindness of data that is assigned to be decrypted. An input unit of the decryption device receives a cipher text C' generated by providing a blind effect to a cipher text C and second decryption information $d_2$ from a user and transmits them to a decryption unit. The decryption unit takes a modulus n and first decryption information $d_1$ from a modulus storage unit and a first decryption information storage unit, respectively. The decryption unit then calculates the expression $R = C'^{d_1 d_2} \bmod n$ and outputs R through an output unit. If a combination of a cipher text C and the second decryption information $d_2$ is correct, a correct decryption result is available.

39 Claims, 17 Drawing Sheets

DECRYPTION METHOD AND DEVICE, AND ACCESS RIGHT AUTHENTICATION METHOD AND APPARATUS

BACKGROUND OF THE INVENTION

1. Field of the Invention

The present invention relates to encryption and decryption of digital data and authentication of access rights to digital data or services, which applies the encryption and decryption of the digital data.

2. Discussion of the Related Art

To protect the data security by encryption and decryption, there are the following two types of relationships between a user of encrypted data and an owner of a decryption key that is necessary to decrypt the data.

1) The user of the data and the owner of the decryption key are the same person.
2) The user of the data and the owner of the decryption key are not the same person.

As an example of 1), personal confidential communication is a typical case. In this case, the recipient holds a decryption key for the data in secret. The sender encrypts the data with an encryption key corresponding to the decryption key of the recipient. The recipient's leakage of the decryption key to the third party leads to an intrusion into the recipient's privacy, which is a great disadvantage to the recipient. Therefore, if the recipient obtains the decryption key, no problem is expected.

As an example of 2), a simultaneous multi-address transmission of the digital data is mentioned. The charged digital data simultaneously transmitted to multi-addresses is encrypted and cannot be used without being decrypted. Although the decryption key is known to a third party, it will not be any disadvantage to a recipient of the data. Therefore, if the recipient obtains the decryption key for decrypting the encrypted digital data, there occurs a possibility that the recipient leaks the decryption key to the third party to get good value for it. In other words, the user of the data has a positive reason to leak the decryption key. Accordingly, it is necessary to separate the user of the data from the owner of the decryption key.

The satellite broadcast now solves the problem by storing the decryption key in an area in a hardware that is inaccessible from the outside and assigning the decryption of the data to the hardware (referred to as delegated decryption). The user of the digital data cannot obtain the decryption key, and therefore the problem that the decryption key is leaked by the user of the digital data does not arise.

Not only in the satellite broadcast, the same method is also used in the case where the decryption is performed on the data transmitted simultaneously to many and unspecified addresses, such as the simultaneous multi-address transmission through the World Wide Web (WWW) of the Internet or the cable television broadcast (CATV). There are many kinds of assignee, for example, a built-in decryption device of a satellite broadcast tuner, an IC card with a decryption function, a computer connected to a network and so forth. Any of them performs the delegated decryption.

If the delegated decryption is performed in an easy manner that the encrypted data is directly transmitted to the decryption device and the decryption result is received from the decryption device, the following problems arise.

(1) The decryption device can learn what is decrypted and what is a result of the decryption.

The decryption device can be created so that a history of the delegated decryption is generated. If such decryption device has been created, there occurs a possibility that a privacy of a recipient of data as to what kind of data he/she would like to decrypt is recorded by the decryption device and later used illegitimately. Such decryption device is also a disadvantage to a sender of the data because the sender cannot delegate the decryption of the data undesirable to be known to the decryption device. In the example of the satellite broadcast, if data of a movie is encrypted and sent, the decryption device stores the decrypted plain data of the movie. The data of the movie may be illegitimately used by the creator of the decryption device.

(2) If there is an intruder intercepting a communication with the decryption device, the intruder can learn what is decrypted and what is a result of decryption.

The seriousness of the problem can be understood by considering the example in which the recipient of delegation of the decryption is a computer connected to a network. Without any countermeasure, a third party intercepting the network can easily learn what is decrypted and what is a result of the delegated decryption.

A blind decryption is a technique of delegated decryption that clears up the above two problems. A blind decryption method based on the RSA (Rivest-Shamir-Adleman) is disclosed by "Fair Public Key Cryptosystem", Proc. Crypto 92, pp. 113–138 (1993). The outline is described as follows.

It is assumed that a person delegating the decryption is "Alice" and a decryption device that performs decryption on delegation is "Bob". It is further assumed that a decryption key held by Bob is D, an RSA modulus is n and an encryption key is E. Since this is the RSA cryptosystem, the following expression is established:

$$ED \equiv 1 \bmod \phi(n)$$

wherein $\phi(n)$ is an Euler number of n.

It is then assumed that the result of encryption of a plain text M with n and E is expressed as $C = M^E \bmod n$.

1) Alice generates a random number r and calculates the expression $C' = r^E C \bmod n$, and transmits C' to Bob.

2) Bob calculates the expression $R = C'^D \bmod n$ and transmits R to Alice.

3) Alice obtains $r^{-1}$ which satisfies the expression $r^{-1} r \equiv 1 \bmod n$, and calculates the expression $M' = r^{-1} R \bmod n$.

With the following expression, it is possible to confirm that Alice can obtain a correct decryption result according to the above procedures:

$$M' \equiv r^{-1} R \equiv r^{-1} C'^D \equiv r^{-1} (r^E C)^D \equiv r^{-1} (r^E M^E)^D \equiv r^{-1} r M \equiv M \bmod n \quad (1)$$

In this method, Bob and a third party intercepting the communication between Bob and Alice can only know $C' = r^E C \bmod n$ and $R = C'^D = rM \bmod n$. The encrypted text C that Alice wanted to decrypt and its decryption result M cannot be known to Bob and the intruder intercepting the communication. This method thus resolves the above two problems of the assigned decryption.

Japanese Patent Application Laid-Open No. 10-247905 suggests a device for controlling the access to the digital data, which employs the blind decryption.

The device for access controlling disclosed by the above application consists of a proving device for proving an ownership of the access right to the data and a verification device for verifying the proof by the proving device. The verification device stores encrypted digital data and another piece of data generated by encrypting a key for decrypting the digital data with an RSA public key (the another piece of data is referred to as an encrypted key). The proving device is an RSA decryption device. The verification device delegates the decryption of the encrypted key by using the blind decryption to the proving device and then decrypts the digital data with a result of the delegated decryption. If the digital data is correctly decrypted, it is considered that the proving device succeeded in proving the ownership of the access right.

Owing to the use of the blind decryption, the content of the delegated encrypted key and the decryption key of the digital data cannot be known to the proving device or an intruder intercepting the communication between the verification device and the proving device.

The technique of the Japanese Patent Application Laid Open No. 10-247905 is particularly characterized by the configuration of the proving device which is of the RSA type. The Japanese Patent Application Laid Open No. 10-247905 suggests embedding of the RSA decryption key in changeable data called an access ticket for enabling the decryption of multiple RSA public keys with a single proving device. To prevent stealing the RSA decryption key from the access ticket, the access ticket is created by masking the RSA decryption key. Thereby it is possible to open the access ticket. The proving device disclosed by the Japanese Patent Application No. 10-247905 contains tamper resisting hardware such as an IC card. The masking effect of the access ticket is removed only by the tamper-resisting the hardware.

The access controlling disclosed by the above application is now described in detail.

The verification device holds encrypted data and an encrypted key K* generated by encrypting a key K for decrypting the encrypted data with the RSA modulus n and an encryption key E. The proving device has an IC card with a function for operating a modulus exponentiation and calculating a one-way hash function f(x, y). The IC card further stores secret data d. If the decryption key for the RSA modulus n and the encryption key E is D, the access ticket is t=D−f (d, n).

The proof and verification of ownership of the access rights are executed according to the following procedures.

1. The verification device generates a random number r.
2. The verification device calculates $C = r^E K^*$ mod n and transmits n and C to the proving device, provided that K* is $K^E$.
3. The proving device calculates $R_1 = C^{f(d, n)}$ mod n in the IC card.
4. The proving device calculates $R_2 = C^t$ mod n.
5. The proving device calculates $R = R_1 R_2$ mod n and transmits the result to the verification device.
6. The verification device obtains $r^{-1}$ that satisfies $r^{-1} r \equiv 1$ mod n and then calculates $K' = r^{-1} R$ mod n.

If the above procedures are correctly executed, K≡K' mod n is obtained. Therefore, ownership of the access rights can be proved according to the following expression.

$$K' = r^{-1} R = r^{-1} R_1 R_2 = r^{-1} C^{f(d,n)+1} C^t = r^{-1} C^{f(d,n)+1} = r^{-1} C^D = r^{-1} (r^E K^*)^D = r^{-1} (r^E K^E)^D = r^{-1} r K = K \bmod n \quad (2)$$

In this method, if a user possesses an IC card having d different for each user, an access ticket for decrypting an encrypted key of the digital data is also different for each user. Although a user copies and uses an access ticket of another person, it is impossible to prove the ownership of the access right. Therefore, an access right of each user can be controlled by limiting issuance of the access ticket to each user. Moreover, if the RSA modulus n and the encryption key E are changed for each piece of the digital data, an access ticket for a certain piece of data cannot be used for other pieces of data. Thus, it is possible to control the access to each piece of the digital data.

The problem of the blind decryption originates in its strong blindness. According to the blind decryption, the decryption device can obtain information only about reception of delegation of decryption for a certain piece of data when the decryption is delegated. No information about the data assigned to be decrypted is transmitted to the decryption device. However, there are many requests for transmitting a specific type of information about the data to the decryption device when the decryption is assigned. Examples of the requests are as follows:

1) If a fee is charged for the delegated decryption service, and if the decryption fee is different for each piece of data, the decryption fee should be informed to the decryption device together with the transmission of the encrypted data.

2) If a term of the use is fixed for each piece of data, the term of the use should be informed to the decryption device together with the transmission of the encrypted data, and it should be checked by the decryption device.

3) If users of each piece of the data are limited, a list of users of the data should be transmitted with the encrypted data and it is checked by the decryption device whether the person delegating the decryption is a qualified user of the data.

4) If the delegated decryption of a confidential document is executed, an identifier of encrypted data should be transmitted to the decryption device with the encrypted data and the decryption device must store them for a later inspection.

However, suppose that these pieces of information are transmitted to the decryption device together with the encrypted data without any contrivance. It is then possible for the person who delegates the decryption to replace a piece of information to be attached to the data with another one at his/her own convenience if he/she has a malicious intent. Several types of illegitimate actions become possible, for example, to transmit information including a fee for delegated decryption of a piece of data lower than the actual fee, to transmit information including a term of use prescribed to be longer than the actual term, to transmit a list of accessible persons or an identifier that is different from the reality, or the like.

The same is true with the technique of the Japanese Patent Application Laid Open No. 10-247905 that controls the access to the digital data applying the conventional blind decryption. The invention disclosed by the above application includes a tamper-resisting IC card. It is hardly possible to change the process executed in the IC card or to tamper with the information stored in the IC card. Therefore, if the information is correctly transmitted to the IC card, the security in the IC card can be guaranteed. It is desirable to store the fee for accessing the data or to check the term of the access to the data within the IC card. However, in the Japanese Patent Application No. 9-418, there is no means to securely transmit those pieces of information to the IC card because the application utilizes the conventional blind decryption without any changes.

SUMMARY OF THE INVENTION

The present invention has been made in view of the above circumstances and has an aspect to provide a blind decryption that can securely transmit a specific piece of information to a decryption device while keeping the blindness of data delegated to be decrypted.

Another aspect of the present invention is to control the access to the digital data by applying the above-described blind decryption method.

Additional aspects and advantages of the invention will be set forth in part in the description which follows and in part will be obvious from the description, or may be learned by practice of the invention.

To achieve the former aspect of the present invention, a decryption device that decrypts a cipher text encrypted by RSA method comprises a first storage unit that stores a modulus n of a modulus exponentiation operation and a second storage unit that stores first decryption information. The device also comprises a cipher text input unit that inputs the cipher text and an information input unit that inputs second decryption information. The device further comprises an operation unit that performs the modulus exponentiation operation by raising the cipher text to a power, a product of the first decryption information and the second decryption information, modulo n and outputs a result of the operation.

With this configuration, two pieces of decryption information, the first and the second are required when a decryption device decrypts the encrypted data.

Encryption is to raise a piece of data to a power, an encryption key, modulo n. Decryption is correctly performed if a product of the encryption key, the first decryption information and the second decryption information is 1 modulo an Euler number of n ($\phi(n)$).

It is assumed that the second decryption information is input to the decryption device from the outside. Therefore, the correct decryption result is unavailable unless the encrypted data and the second decryption information are correctly input.

The device may be configured so that the information that must not be substituted, such as a decryption fee of each data, is input to the device as the second decryption information. Then a penalty of unsuccessful decryption is imposed for illegitimate substitution of information.

As another configuration of the decryption device that requires the first decryption information and the second decryption information for decrypting the encrypted data, the decryption device may raise the encrypted data to a power, an inverse number of the second decryption information modulo the first decryption information, modulo n and may output it as a decryption result.

With this configuration, if the first decryption information is an Euler number of the modulus n and the second decryption information is an encryption key, the decryption is correctly performed.

In this configuration, also, the second decryption information is input to the decryption device from the outside. Therefore, unless the encrypted data and the second decryption information are correctly input, the correct decryption result cannot be obtained.

With this configuration, it is also assumed that the information that must not be substituted, such as a decryption fee of data, is input to the decryption device as the second decryption information. Then a penalty of unsuccessful decryption is imposed for illegitimate substitution of information.

To achieve the latter aspect of the present invention, an access right authentication apparatus that authenticates an access right of a user by verifying legitimacy of a response generated for proving the access right of the user, comprises a first storage unit that stores challenging data, a second storage unit that stores user identifying information, a third storage unit that stores proof support information that is a result of a predetermined operation on the user identifying information and security characteristic information and a fourth storage unit that stores security required information.

The apparatus also comprises a response generation unit that generates a response by executing a predetermined operation on the challenging data, the user identifying information, the proof support information and the security required information, and a response verification unit that verifies the response is generated based on the security characteristic information and the security required information.

With this configuration, a legitimate combination of the response, the user identifying information, the proof support information and the security required information indispensable for correct authentication of the access right.

The information that must not be substituted, such as an access fee, should be included in the security required information. Then a penalty of access rejection is imposed for illegitimate substitution of information.

With another configuration of the latter aspect of the present invention, an access right authentication apparatus that authenticates a user's access right by verifying legitimacy of a response generated for proving the user's access right, comprises a first storage unit that stores challenging data, a second storage unit that stores user identifying information and a third storage unit that stores proof support information that is a result of a first predetermined operation on the user identifying information and security characteristic information. The apparatus also comprises a fourth storage unit that stores security required information, a fifth storage unit that stores security examination information, and an examination unit that examines whether the security examination information stored in the fifth storage unit has a specific relationship with a result of a second predetermined operation on the challenging data stored in the first storage unit and the security required information stored in the fourth storage unit. The apparatus further comprises a response generation unit, when the examination unit finds that the security examination information has the specific relationship with the result of the second predetermined operation, that generates a response by executing a third predetermined operation on the challenging data stored in the first storage unit, the user identifying information stored in the second storage unit and the proof support information stored in the third storage unit, and a response verification unit that verifies the response is generated based on the security characteristic information and the security required information.

With this configuration, a legitimate combination of the response, the user identifying information, the proof support information and the security required information indispensable for correct authentication of the access right.

The information that must not be substituted, such as an access fee, should be included in the security required information. Then a penalty of access rejection is imposed for illegitimate substitution of information.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENTS

Preferred embodiments of decryption method and device, and access right authentication method and apparatus according to the present invention are now described in detail based on the drawings.

First Embodiment

Figure 1:
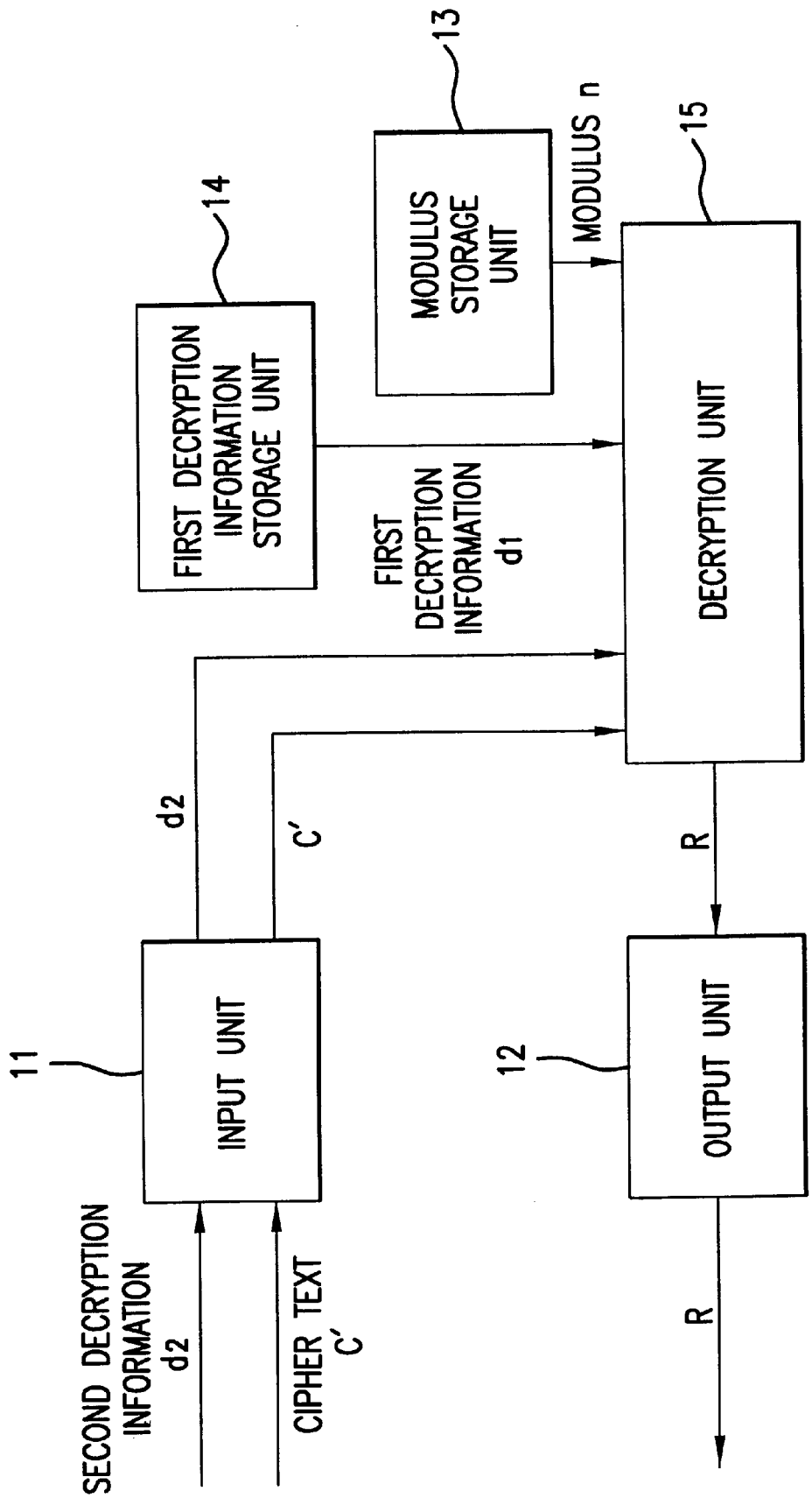
FIG. 1 is a block diagram showing a decryption device in a first embodiment according to the present invention.

The first embodiment of the present invention is a blind decryption device. The configuration of the device is shown in FIG. 1. The present embodiment adopts a modulus exponentiation operation using a composite number n as a modulus, in which X is raised to a power Y modulo n (both X and Y are integers), for an encryption/decryption method. The decryption device of the present embodiment requires a modulus n and two pieces of decryption information $d_1$ and $d_2$ for decryption. An encryption key E, $d_1$ and $d_2$ are generated to satisfy the following expression (1):

$$Ed_1d_2 \equiv 1 \bmod \phi(n) \quad (1)$$

wherein $\phi(n)$ is an Euler number of n.

A cipher text C corresponding to a piece of data M is generated according to the following expression (2):

$$C = M^E \bmod n \quad (2)$$

A user of the blind decryption device of the present embodiment possesses the cipher text C, a modulus n, the encryption key E and the second decryption information $d_2$. When the user delegates decryption of C to the decryption device of the present embodiment, he/she generates C' by providing a blind effect to C, and inputs C' and $d_2$ to the decryption device. The user then receives an output R from the decryption device. Finally, the user removes the blind effect from R to obtain a decryption result.

Specific procedures executed by a user who uses the decryption device are as follows.

1. The user generates a random number r (1<r<n).
2. The user calculates the following expression (3) to provide the blind effect to the cipher text C.

$$C' = r^E C \bmod n \quad (3)$$

3. The user transmits C' and $d_2$ to the blind decryption device and receives an output R from the device.
4. The user calculates the following expression (4) to obtain a decryption result M'.

$$M' = r^{-1} R \bmod n \quad (4)$$

The blind decryption device of the present embodiment comprises the following sub units: an input unit 11 that inputs a blind-effected cipher text C' and second decryption information $d_2$; an output unit 12 that outputs a decryption result R; a modulus storage unit 13 that stores a modulus n; a first decryption information storage unit 14 that stores the first decryption information $d_1$; and a decryption unit 15 that calculates the decryption result R based on n, C', $d_1$ and $d_2$.

Procedures executed by the blind decryption device of the present embodiment are as follows.

1. The input unit 11 receives the blind-effected cipher text C' and the second decryption information $d_2$ from the user and transmits them to the decryption unit 15.
2. The decryption unit 15 obtains the modulus n from the modulus storage unit 13 and the first decryption information $d_1$ from the first decryption information storage unit 14 and then calculates the following expression (5).

$$R = C'^{d_1 d_2} \bmod n \quad (5)$$

3. The output unit 12 outputs R.

The following expression (6) shows that the correct decryption is performed when the combination of the cipher text C and the second decryption information $d_2$ is legitimate.

$$M = r^{-1} R = r^{-1} C'^{d_1 d_2} = r^{-1}(r^E C)^{d_1 d_2} = r^{-1} r M \equiv M \bmod n \quad (6)$$

If a piece of information different from the second decryption information $d_2$ is transmitted instead of $d_2$ to the blind decryption device, the user cannot obtain a correct decryption result. Therefore, it is possible to prevent transmission of a false decryption fee to the decryption device by including the decryption fee in the second decryption information $d_2$.

However, if the second decryption information $d_2$ is not a prime number, a problem arises. When the factorization $d_2 = a*b$ is possible, though $C'^a \bmod n$ and b are transmitted to the decryption device instead of C' and $d_2$, the same output can be obtained from the decryption device.

Accordingly, it is possible to obtain a correct decryption result by transmitting false decryption information b instead of $d_2$.

To prevent the occurrence of the problem, the combination of E, $d_1$ and $d_2$ should be determined so that $d_2$ becomes a prime number.

Although $d_2$ is a prime number, the same output can be obtained by transmitting $C^{d2}$; mod n and 1 to the decryption device instead of C' and $d_2$. To prevent this problem, the decryption device should have means for confirming that the transmitted second decryption information is a value excepting for 1. The decryption is performed only when the second decryption information is a value excepting for 1.

If $d_2$ is not a prime number, it is effective to determine the combination of E, $d_1$ and $d_2$ so that $d_2$ has a redundancy, for example, repetition of a specific value, and to dispose means for confirming the redundancy in the transmitted second decryption information in the decryption device. If a probability that a nontrivial divisor of $d_2$ has the redundancy known to the decryption device is sufficiently low, the attack of transmitting the divisor to the decryption device instead of $d_2$ can be avoided by this method.

It is also possible to add a hash function operation unit that performs a one-way hash function V(x) to the blind decryption device and to calculate the following expression (7) instead of the expression (5).

$$R = C'^{d_1 V(d_2)} \bmod n \qquad (7)$$

The one-way hash function has a characteristic that it is very difficult to calculate x and y that satisfy h(x)=h(y) which are different from each other. As the examples of the one-way hash function, MD2, MD4 and MD5 by RSA Data Securities Inc., the Secure Hash Standard by the U.S. Federal Government and so forth are known.

In this case, the encryption key E, $d_1$ and $d_2$ are generated to satisfy the following expression (8).

$$Ed_1 V(d_2) \equiv 1 \bmod \phi(n) \qquad (8)$$

With this configuration, it is possible to keep V(x) secret to the user, and therefore the security is improved. Moreover, $d_2$ larger than the modulus n is available.

If the decryption fee information is included in the second decryption information, the decryption device is configured to store the transmitted decryption fee information and the decryption fee is charged to the person who delegated the decryption based on the stored fee information, a delegated decryption system able to impose decryption fees without falsehood can be realized.

In another configuration, information about the term of the use of the encrypted data is included in the second decryption information. The decryption device is configured to have a clock. Thereby the transmitted term of the use and the time indicated by the clock are compared to determine whether the decryption should be performed. Thus, a delegated decryption system that can limit the term of the use of data is available.

In the other configuration, information about attributes of the encrypted data is included in the second decryption information. The decryption device is configured to store the transmitted attribute information. Thereby a delegated decryption system that stores the data which can be used in a statistical work, an inspection or the like is available.

Second Embodiment

Figure 2:
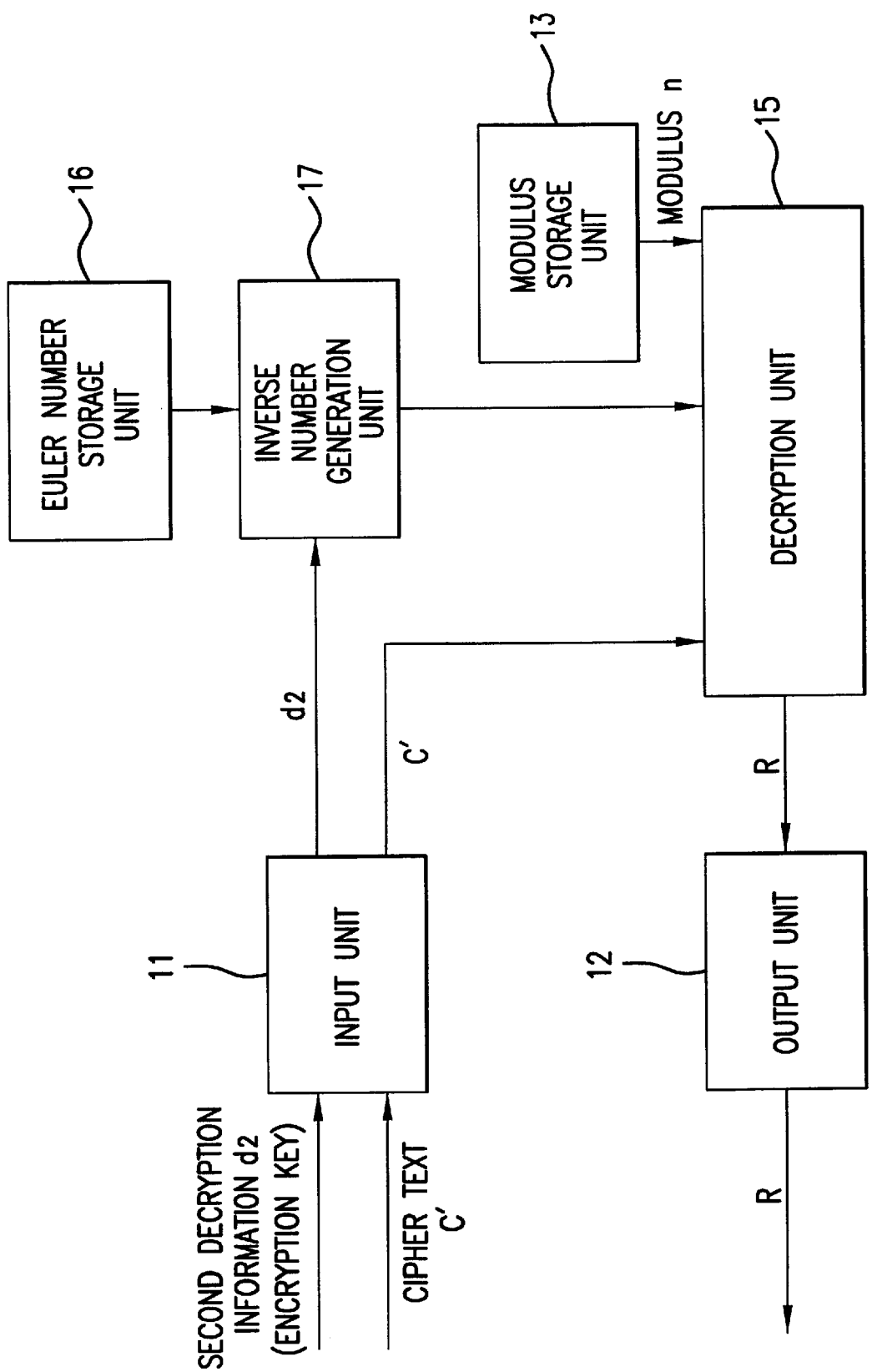
FIG. 2 is a block diagram showing a decryption device in a second embodiment according to the present invention.

The second embodiment is also a blind decryption device. A configuration of the device is shown in FIG. 2.

The present embodiment adopts the modulus exponentiation using a composite number n as a modulus for an encryption/decryption method. The decryption device uses the modulus n, two pieces of decryption information $d_1$ and $d_2$ for decryption. The decryption information $d_1$ is an Euler number of the modulus n and the decryption information $d_2$ is the encryption key E. The encryption key E and the decryption information $d_1$ are generated to be relatively prime.

The cipher text C for a piece of data M is generated according to the above expression (2).

The user of the blind decryption device of the present embodiment has the cipher text C, the modulus n and the encryption key E (the second decryption information $d_2$). When the user assigns the decryption of C to the decryption device of the present embodiment, he/she generates C' by providing a blind effect to C, and inputs C' and E to the decryption device. The user then receives an output R from the decryption device and removes the blind effect of R to obtain a decryption result.

The specific procedures for the user to use the decryption device of the present embodiment are the same as those of the first embodiment.

The blind decryption device of the present embodiment comprises the following sub-units: an input unit 11 that inputs a cipher text C' that is blind-effected and an encryption key E; an output unit 12 that outputs a decryption result R; a modulus storage unit 13 that stores a modulus n; an Euler number storage unit 16 that stores an Euler number $\phi(n)$; an inverse number generation unit 17 that inputs a modulus and an integer and calculates an inverse number of the integer with the modulus; and a decryption unit 15 that obtains the decryption result R based on n, C' and the result of calculation of the inverse number generation unit 17.

Procedures of the blind decryption device of the present embodiment are as follows.

1. Through the input unit 11, the decryption device receives the blind-effected cipher text C' and second decryption information $d_2$ from the user. C' and $d_2$ are transmitted to the decryption unit 15 and the inverse number generation unit 17, respectively.

2. The inverse number generation unit 17 takes an Euler number $\phi(n)$ out of the Euler number storage unit 16. The inverse number of $d_2$ modulo the Euler number $\phi(n)$, $d_2^{-1}$ modulo $\phi(n)$, is calculated. The result is transmitted to the decryption unit 15.

3. The decryption unit 15 takes the modulus n out of the modulus storage unit 13 and calculates the following expression (9).

$$R = C'^{(d_2^{-1})} \bmod n \qquad (9)$$

4. R is output through the output unit 12.

If the combination of the cipher text C' and the second decryption information $d_2$ is legitimate, it is confirmed according to the following expression (10) that the decryption has been correctly executed.

$$M' = r^{-1} R = r^{-1} C'^{(d_2^{-1})} = r^{-1}(r^E C)^{(d_2^{-1})} = r^{-1}(r^E M^E)^{(d_2^{-1})} = r^{-1} rM = M \bmod n \qquad (10)$$

If the user transmits information different from the second decryption information to the blind decryption device of the present embodiment, he/she cannot obtain the correct decryption result. Therefore, it is possible to prevent transmission of false decryption fee to the decryption device by including the decryption fee in the second decryption information.

It is also possible to add a hash function operation unit that performs a one-way hash function V(x) to the blind decryption device and to calculate an inverse number of $V(d_2)$, $V(d_2)^{-1}$ instead of calculating the inverse number of $d_2$ by the inverse number generation unit 16. The following expression (11) may be calculated by the decryption unit 15.

$$R=C'^{(V(d_2))^{-}} \bmod n \qquad (11)$$

In this case, the encryption key E is $V(d_2)$. With this configuration, it is possible to use $d_2$ larger than the modulus.

It is also possible to store prime factors of the modulus n instead of storing the Euler number of the modulus n and to calculate the Euler number when the decryption is executed.

Further, it is possible to store prime factors of the modulus n instead of storing the Euler number of the modulus n, to perform the modulus exponentiation operation with each prime factor as a modulus and then obtain a result with the modulus n based on the Chinese remainder theorem.

Specifically, if n is a product of two prime numbers p and q, the following expressions are calculated:

$$R_1 = C'^{d_2 - i \bmod (p-1)} \bmod p$$

$$R_2 = C'^{d_2 - 1 \bmod (q-1)} \bmod q.$$

It is possible to calculate R from $R_1$ and $R_2$ based on the Chinese remainder theorem.

Figure 3:
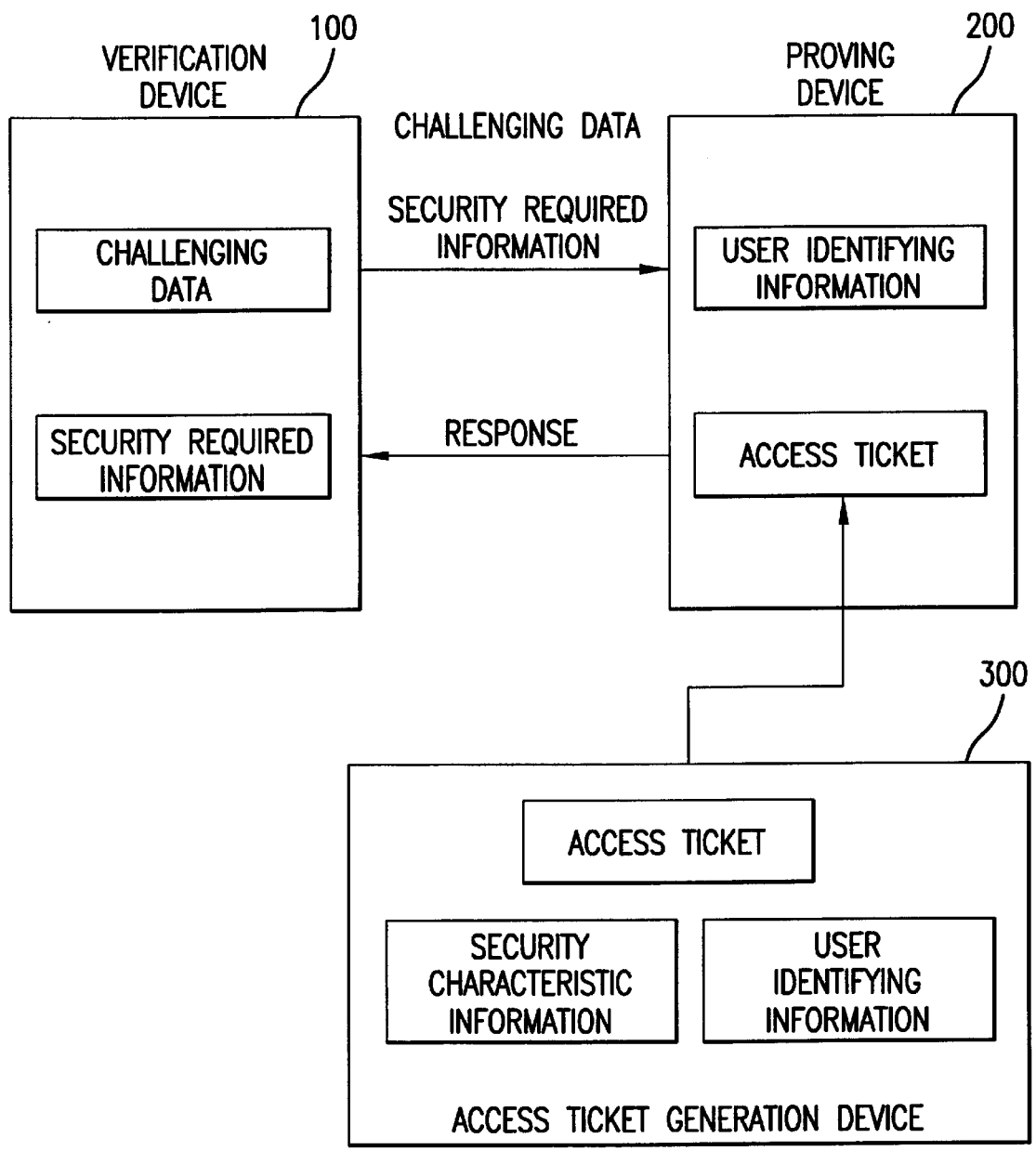
FIG. 3 is a block diagram showing a basic configuration of an access right authentication apparatus in third to sixth embodiments according to the present invention.

Third, fourth, fifth and sixth embodiments of the present invention are access right authentication apparatuses. A basic configuration common to these embodiments is shown in FIG. 3.

In the figure, each of these access right authentication apparatuses has a verification device 100 and a proving device 200. The proving device 200 generates a response utilizing an access ticket generated by an access ticket generation device 300. The verification device 100 is annexed to services or digital data that require authentication of access right to use, which verifies ownership of a legitimate access right of a user of the services or digital data. The proving device 200 is possessed by the user of the services or digital data, which proves to the verification device 100 that the user has a legitimate access right.

For authentication of an access right, the verification device 100 transmits challenging data to the proving device 200 that generates a response corresponding to the challenging data and returns it to the verification device 100. In the third, fourth, fifth and sixth embodiments, the challenging data transmitted by the verification device 100 is generated by encrypting arbitrary data. The proving device 200 decrypts the challenging data to generate the response. The verification device 100 examines whether the response returned by the proving device is a result of correct decryption of the challenging data. Thus, the response is verified.

For generation of the response, the challenging data, the user identifying information, an access ticket and security required information are required.

The user identifying information is a piece of digital data corresponding to each user of the services or digital data, which is different from user to user. The user identifying information is stored in the proving device 200 in a format that the user cannot access.

The access ticket is a piece of digital data generated from security characteristic information and the user identifying information.

The security required information is possessed by the verification device 100. The information is transmitted to the proving device with the challenging data.

In the third, fourth, fifth and sixth embodiments, the challenging data cannot be decrypted until both security characteristic information and security required information are available. Accordingly, if an intruder intercepting the communication between the verification device 100 and the proving device 200 takes an illegitimate action such as substitution of the security required information transmitted to the proving device 200 with the challenging data, the intruder cannot obtain a correct response. Thereby it is possible to prevent substitution of the security required information with something else.

In the third, fourth, fifth and sixth embodiments, the access right authentication apparatus can be configured so that information about the fees for using the services or digital data is embedded in the security required information. The transmitted information about the fees is then stored in the proving device 200 in a form that user cannot change. If the using fee is charged to the user based on the information about fees, it is possible to charge fees to the user without deceit.

In another configuration of the third, fourth, fifth and sixth embodiments, information about the term of the use of the services or digital data can be included in the security required information. The proving device 200 is configured to have a clock. Thereby the transmitted term of the use and the time indicated by the clock are compared to determine whether the response can be generated. Thus, an access right authentication apparatus that can limit the term of the use of services or digital data is available.

In the other configuration of the third, fourth, fifth and sixth embodiments, information about attributes of the services or digital data may be included in the security required information. The proving device 200 can be configured to store the transmitted attribute information in a form that any user cannot change. Thereby an access right authentication apparatus that stores the data, which can be used in a statistical work, an inspection or the like, is available.

Third Embodiment

Figure 4:
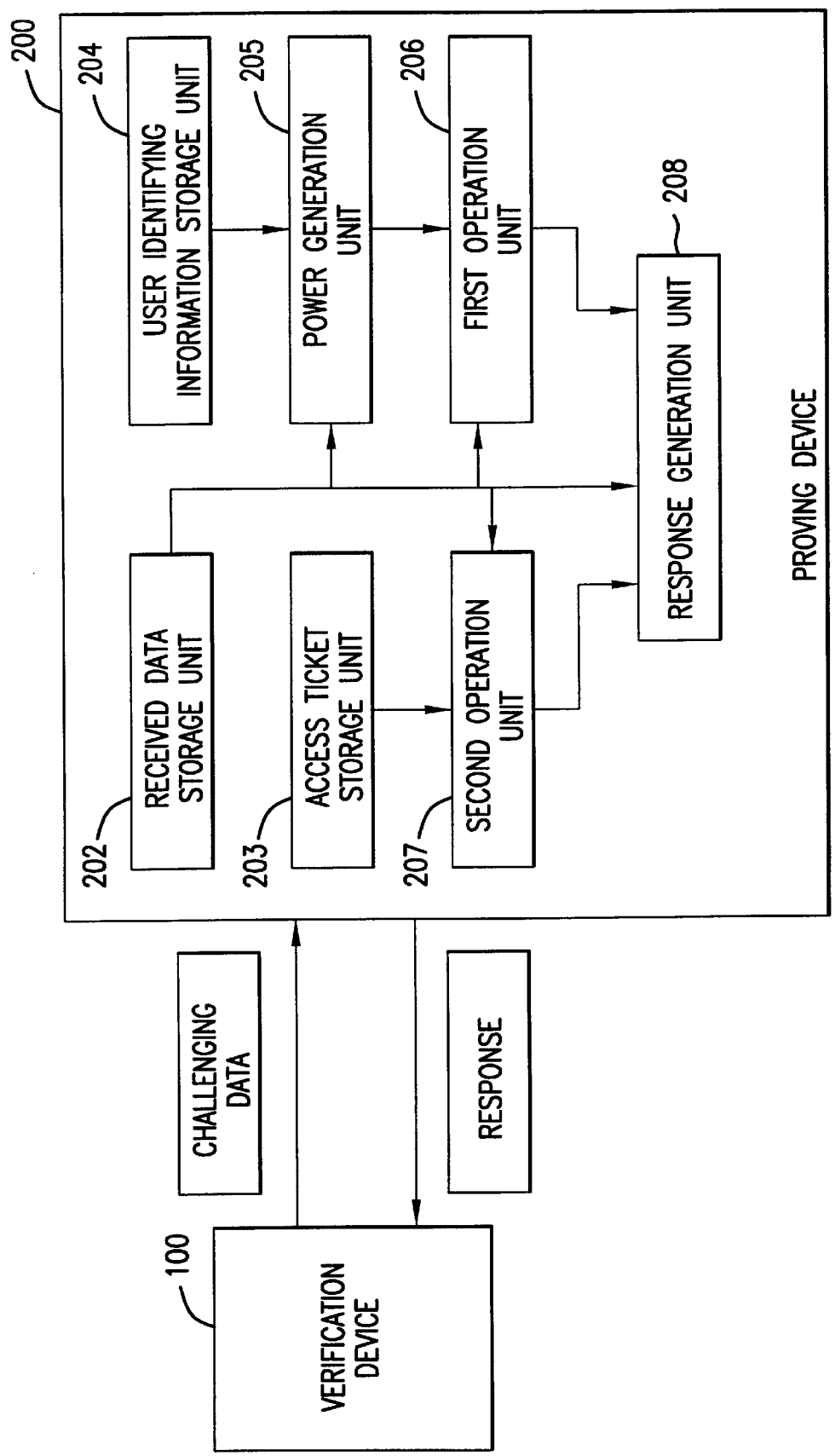
FIG. 4 is a block diagram showing a configuration of a proving device of the access right authentication apparatus in the third embodiment according to the present invention.
Figure 8:
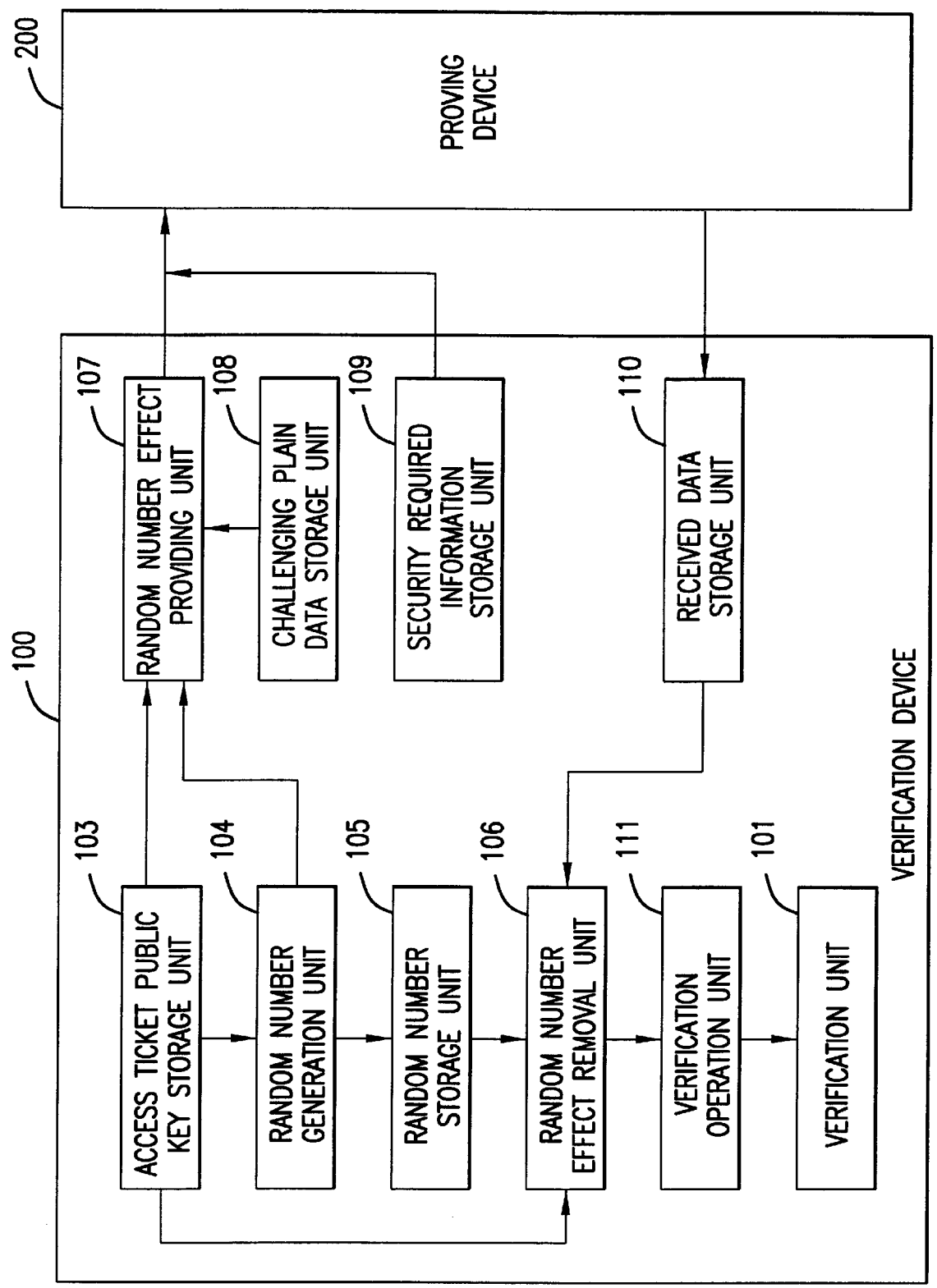
FIG. 8 is a block diagram showing a configuration of a verification device of the access right authentication apparatus in the third, fourth and sixth embodiments according to the present invention.
Figure 10:
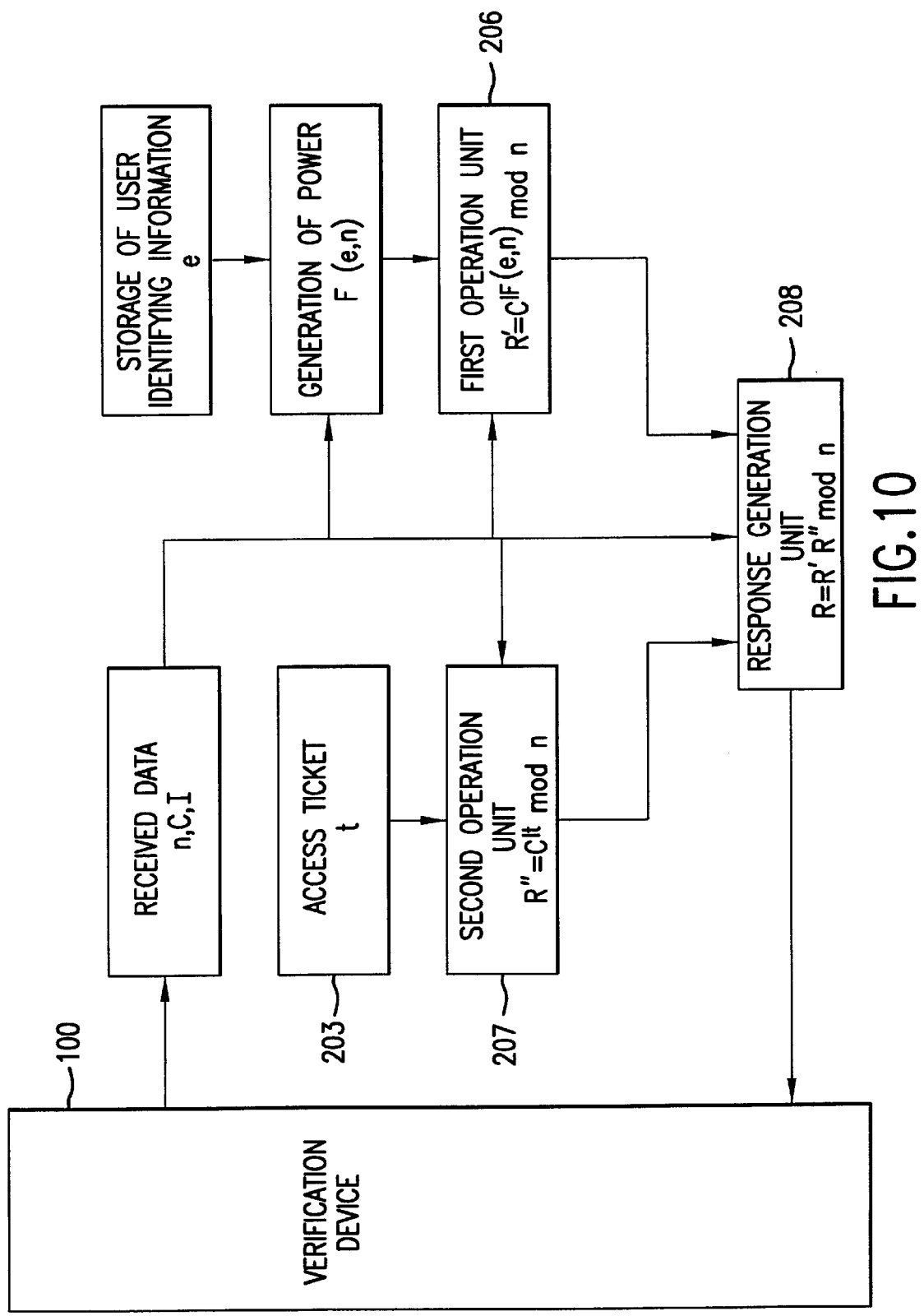
FIG. 10 illustrates operations of the proving device of the access right authentication apparatus in the third embodiment according to the present invention.
Figure 11:
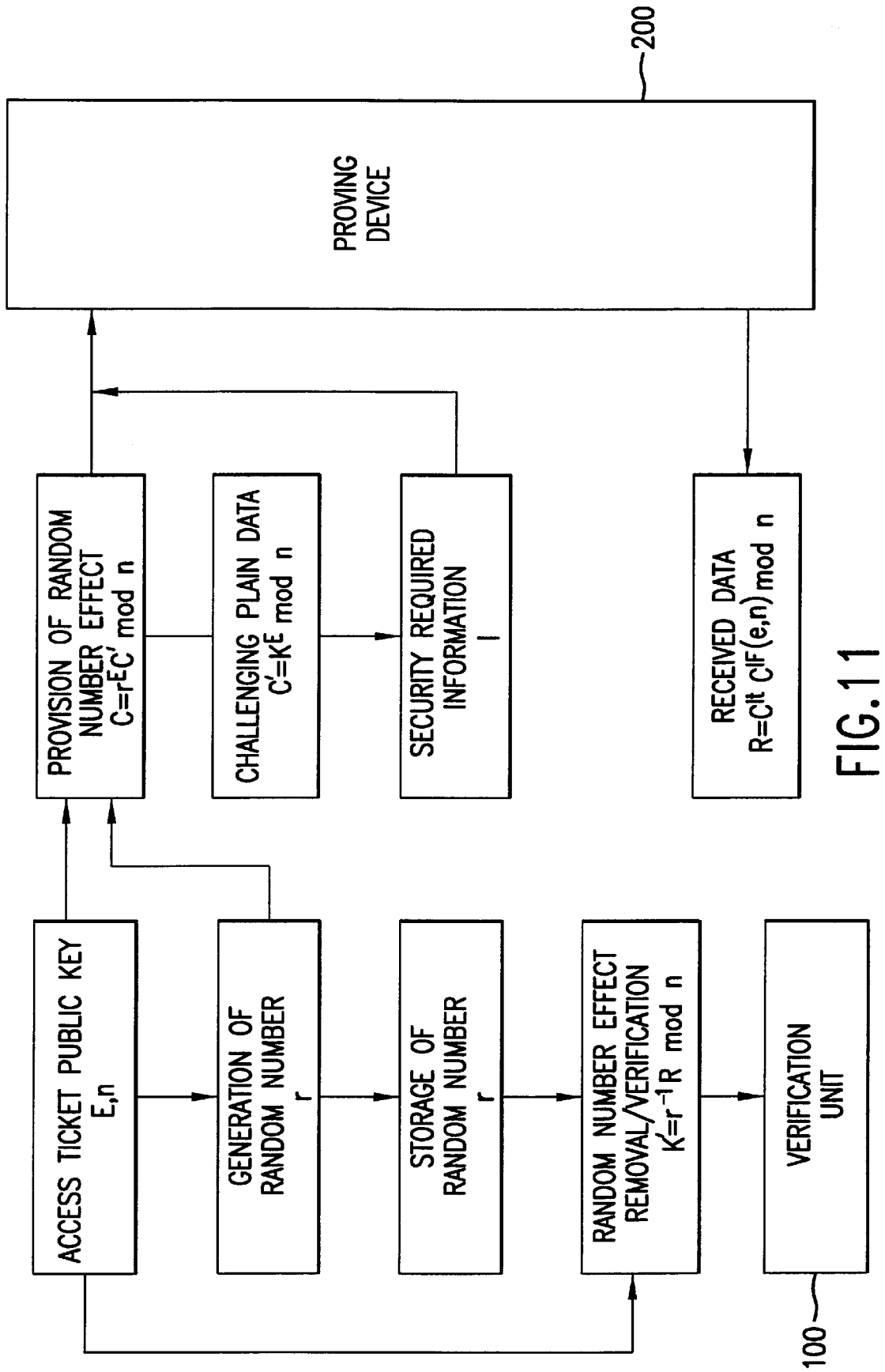
FIG. 11 illustrates operations of the verification device of the access right authentication apparatus in the third embodiment according to the present invention.

Configurations of a proving device and a verification device of the third embodiment are shown in FIGS. 4 and 8, respectively. Operations of the proving device and the verification device are shown in FIGS. 10 and 11, respectively.

As shown in FIG. 4, the proving device 200 includes a received data storage unit 202, an access ticket storage unit 203, a user identifying information storage unit 204, a power generation unit 205, a first operation unit 206, a second operation unit 207 and a response generation unit 208.

As shown in FIG. 8, the verification device 100 includes a verification unit 101, an access ticket public key storage unit 103, a random number generation unit 104, a random number storage unit 105, a random number effect removal unit 106, a random number effect providing unit 107, a challenging plain data storage unit 108, a security required information storage unit 109, a received data storage unit 110 and a verification operation unit 111.

In the third embodiment of the present invention, the security characteristic information D, public information E and n corresponding to D and the security required information I are defined as follows.

n is an RSA modulus, a product of two prime numbers p and q which are sufficiently large, satisfying the following expression (12).

$$n=pq \qquad (12)$$

$\phi(n)$ is an Euler number of n calculated by the following expression (13).

$$\phi(n)=(p-1)(q-1) \qquad (13)$$

The security characteristic information D is an RSA private key modulo n and satisfies the following expression (14).

$$\gcd(D, \phi(n))=1 \qquad (14)$$

Here, gcd(x, y) represents the greatest common divisor of x and y. I is a prime number that satisfies the following expression (15).

$$\gcd(I, \phi(n))=1 \qquad (15)$$

The public information E is generated to satisfy the following expression (16).

$$EID \bmod \phi(n)=1 \qquad (16)$$

D and E are also referred to as access ticket private key and access ticket public key, respectively. The access ticket t is generated using the access ticket private key D, the user identifying information e and the modulus n based on the following expression (17).

$$t=D-F(e, n) \qquad (17)$$

The user identifying information e is different for each user, which is used to identify each user. The function F is a function in which function values hardly collide with each other. For example, it is defined using the one-way hash function as the following expression (18) or (19).

$$F(x, y)=h(x|y) \qquad (18)$$

$$F(x, y, z, u, w)=h(x|y|z|u|w) \qquad (19)$$

Here, x|y denotes the concatenation of two bit-string representations of x and y.

It is possible to open t, E, n and I to the public. On the contrary, D, e, p, q, $\phi(n)$ and the function F are required to be kept secret to everybody but those who have the right to generate the ticket.

Hereinafter, data K that is to be encrypted is referred to as verification data. Data R generated by the proving device is referred to as a response. Data that the proving device 200 receives from the verification device 100 for generating the response is referred to as challenging data.

Operations of the third embodiment are as follows.

1. When a user accesses digital contents that require authentication by the access right authentication apparatus, the verification device 100 is invoked. If the verification device 100 is implemented as a part of an application program running on a PC or workstation of the user, it is activated by the user with a normal method of starting an application program using an instruction device such as a keyboard or mouse. When execution of the application program reaches the program constituting the verification device 100, it is activated.

If the verification device 100 is implemented on the other PC or workstation (referred to as server) connected through a network, the user activates a communication program on his/her own PC or workstation. Then the communication program transmits a channel open request to the server in accordance with predetermined procedures, and the verification device 100 on the server is invoked. For example, suppose that the communication program of the user follows procedures called TCP/IP for communicating with the server. The verification device is associated with a specific port of the server in advance and the communication program of the user is set to designate the port and transmit a TCP connection request to the server. It is then possible that a daemon (inetd) on the server activates the verification device in reply to the TCP connection request. This method of implementation is widely used in the network such as the Internet.

It is possible to implement the verification device 100 as an exclusive-purpose device. For example, the verification device 100 can be implemented as a program written in a ROM in an IC card reader/writer and the proving device 200 can be a program implemented in a microcontroller of an IC card. In this case, when a user inserts the IC card into the reader-writer, the verification device 100 is invoked.

2. The challenging data C, the modulus n stored in the access ticket public key storage unit 103 and the security required information I stored in the security required information storage unit 109 are transmitted from the verification device 100 to the proving device 200. They are written in the received data storage unit 202. In the challenging plain data storage unit 108, C' is stored as the challenging plain data. If arbitrary data K is assumed to be the verification data, the challenging plain data C' and the verification data K satisfy the following expression (20).

$$C'=K^E \bmod n \qquad (20)$$

In the verification device 100, the random number generation unit 104 generates a random number r. The challenging data C is generated by calculating the following expression (21) in the random number effect providing unit 107 using r, E and n obtained from the access ticket public key storage unit 103 and C' obtained from the challenging plain data storage unit 108.

$$C=r^E C' \bmod n \qquad (21)$$

Thus, the challenging data C is generated and written in the received data storage unit 202 in the proving device 200. The generated random number r is stored in the random number storage unit 105.

In this manner, a random number effect is provided to the challenging data and the effect is removed when the response is generated by the proving device 200. In other words, blindness is provided to the challenging data. Thereby the challenging plain data or its decryption result can be concealed from an intruder intercepting the communication between the verification device 100 and the proving device 200 or the proving device 200 itself. A replay attack is also disabled by changing the random number used for the random number effect each time. The following embodiments have the same features as this embodiment. If the verification device is configured so that it does not hold the data K, but holds only C', which is an encryption result of K, and if the verification device has means that verifies coincidence between K and a result of removing the random number effect from the response transmitted from the proving device 200, a risk of leaking the data K from the verification device 100 can be avoided.

3. A power generation unit 205 in the proving device 200 obtains the user identifying information e stored in the user identifying information storage unit 204 and the modulus n stored in the received data storage unit 202 and calculates the following expression (22).

$$F(e, n) \qquad (22)$$

4. The first operation unit 206 in the proving device 200 obtains the security required information I and the modulus n stored in the received data storage unit 202 and calculates the following expression (23) using I, n and the data generated by the power generation unit 205 to obtain R'.

$$R'=C^{IF(e, n)} \bmod n \qquad (23)$$

5. The second operation unit 207 in the proving device 200 obtains the access ticket t stored in the access ticket storage unit 203 and calculates the following expression (24) to obtain R".

$$R"=C^{lt} \bmod n \qquad (24)$$

6. The response generation unit 208 in the proving device 200 obtains R' and R" from the first operation unit 206 and the second operation unit 207, respectively, and calculates the following expression (25) to obtain R.

$$R=R'R" \bmod n \qquad (25)$$

7. The proving device 200 writes R in the received data storage unit 110 in the verification device 100.

8. The random number effect removal unit 106 in the verification device 100 takes the random number r previously generated out of the random number storage unit 105 and calculates the following expression (26)

$$K'=r^{-1} R \bmod n \qquad (26)$$

9. Only when the combination of the access ticket t, the user identifying information e and the security required information I used in the proving device 200 is legitimate, the data K' obtained by calculation and the verification data K coincide with each other. Thus, the verification is correctly performed.

10. The calculated K' is transmitted to the verification unit 101 in the verification device 100. The execution unit 102 performs normal processes only when K'=K is established.

If the above procedures are correctly preformed, it is understood that K and K' coincide with each other according to the following expressions (27).

$$K'=r^{-1}R=r^{-1}R'R"=r^{-1}C^{IF(e,\ n)}C^{lt}=r^{-1}C^{ID}=r^{-1}(r^EC')^{ID}=r^{-1}(r^EK^E)^{ID}=r^{-1}rK=K \bmod n \qquad (27)$$

If an intruder intercepting the communication between the verification device 100 and the proving device 200 substitutes false information I' for the security required information I, K does not coincide with K'. Therefore, the intruder cannot access the services or digital data.

However, if the security required information I is not a prime number, a problem occurs. If factorization I=a*b is possible, though $C^a$ mod n and b are transmitted to the decryption device instead of C and I, the decryption device provides the same output. Accordingly, normal access is available by transmitting the false information b instead of the security required information I. To avoid this problem, the combination of E, D and I should be determined so that I is a prime number.

However, though I is set to a prime number, if $C^I$ mod n and 1 are transmitted to the decryption device instead of C and I, the same output can be obtained from the decryption device. To avoid this problem, the proving device 200 should have means that confirm whether the transmitted information is 1. The proving device 200 is configured to perform exponentiation operation on C only when the information is not 1.

When I is not a prime number, it is effective to determine the combination of E, D and I so that I has a redundancy, for example, repetition of a specific value, and to dispose means that confirms the redundancy in the transmitted security required information in the proving device 200. If a probability that a nontrivial divisor of I has the redundancy known to the proving device 200 is sufficiently low, the attack of transmitting the divisor to the decryption device instead of the security required information can be avoided by this method.

In this embodiment, the user identifying information storage unit 204, the power generation unit 205 and the first operation unit 206 are disposed in the inside of the IC card or the like, which any user cannot access or tamper with. It is then possible to guard the embodiment from illegitimate action enabled by leakage of the user identifying information or tampering with the power generation unit 205 or the first operation unit 206.

It may be possible to add an operation means that performs the one-way hash function V(x, y) to the proving device 200 of the present embodiment and to calculate the following expressions (28) and (29) instead of the expressions (23) and (24).

$$R'=C^{V(I,\ n)F(e,\ n)} \bmod n \qquad (28)$$

$$R"=C^{V(I,\ n)t} \bmod n \qquad (29)$$

In this case, the encryption key E, the security required information I and the security characteristic information D are set to satisfy the following expression (30).

$$EV(I, n)D=1 \bmod \phi(n) \qquad (30)$$

With this configuration, the security required information larger than the modulus is available.

If the configuration of the proving device 200 is changed to calculate the security characteristic information from the access ticket and the output of the power generation unit 205, and to perform the modulus exponentiation operation on the challenging data using the result of calculation, the same effect as this embodiment is obtained.

Some examples for the method of verifying coincidence of K and K' in the verification device 100 are now described. These examples are applicable to the fourth, fifth and sixth embodiments.

[1] Direct comparison of verification data and decryption result

The verification unit 101 stores the verification data K in advance.

A comparison part in the verification unit 101 directly compares the verification data K with the data K' generated by decrypting the challenging data. Only when K'=K is established, a normal process is conducted. Otherwise, an error handling process such as a halt of the process is conducted. This example has a weakness of security that the verification data K, which is an object of verification, appears by itself in the verification device. For instance, if the verification device 100 is implemented as a program running on a PC or workstation of a user, it is possible to analyze the program and steal K, though it is difficult. If the value of K is known to a user, he/she can make a device that copies operations of the proving device 200. An illegitimate access by impersonation is then possible.

[2] Use of one-way function

To overcome the above weakness, the data to be an object of verification stored in the verification unit 101 is changed from the verification data K itself to data h(K) obtained by operating the one-way hash function h on the data K. According to the characteristic of the one-way hash function, it is extremely difficult to calculate x that satisfies an expression y=h(x) from the data y stored in the response storage unit. The verification unit 101 has a transformation part that outputs a result of operation of the one-way hash function on input data. The comparison part compares the output h(K') obtained by operation of the hash function on the data K' generated by decrypting the challenging data with the stored data, namely, h(K). In this example, the verification data K does not appear in the program. Moreover, it is extremely difficult to calculate K from h(K) stored in the response storage unit. Therefore, this example is more secure than example [1]. However, the comparison part is implemented as conditional statements in a program. If the verification device is implemented as a program having a configuration easily analyzed or tampered with, it is possible to tamper with the program to skip the conditional statements. Thus, a weakness still remains.

[3] Decrypted value used as decryption key for decrypting specific data

The data stored for verification is encrypted data. The data K' generated by decrypting the challenging data is a key for decrypting the encrypted data. The verification unit 101 decrypts the encrypted data stored for verification using the value of the data K' as a decryption key. If the encrypted data is decrypted, the program can be executed. With this configuration, the decryption key itself does not appear in the verification device 100. Therefore, high security is available.

[4] Confirmation whether decrypted value satisfies specific redundancy

The verification device 100 has redundancy confirmation unit.

The verification unit 101 transmits the value of data K' generated by decrypting the challenging data to the redundancy confirmation unit. If it is confirmed by the unit that the data has specific redundancy, the program can be executed. Examples of the redundancy are, a specific pattern repeated in decrypted data, a specific condition satisfied by data in a specific position, a meaning held by data as a specific language, and so forth.

[5] Encryption of program code itself

Data generated by encrypting a part or all of program code held by the verification device 100 is stored as challenging plain data in the challenging plain data storage unit. That is, the data K' generated by decrypting the challenging data is a part or all of the program code. The execution unit embeds the data K' in a predetermined position of the program and then executes the program. If the proving device returns correct data, in other words, the data K' is a result of correct decryption of the code, the program can be executed. It is also possible to generate an executable file by embedding the decrypted code in the original program and activate the file. However, it is desirable from the viewpoint of security to embed the decrypted code in the program on a memory and then activate it on the condition that the program is only stored in the memory. In this example, a part or all of the code indispensable for executing the program is encrypted. Therefore, even in the case of relatively low security, such that the program to be executed is implemented as an application program running on a PC or workstation of a user, illegitimate execution of the program can be prevented.

[6] Decrypted value used as decryption key of program

The verification device 100 holds data generated by encryption of part or all of the code of the program. Data K' generated by decrypting the challenging data is a decryption key necessary for decrypting the encrypted program code. With this configuration, it is possible to control the size of the data K' to a predetermined small amount regardless of the size of the code to be encrypted. Thereby an overhead in communication is reduced. The verification unit 101 decrypts the encrypted program code stored by the verification device 100 using the data K'. The decrypted code is embedded in a predetermined position of the program and the program is then executed. The program can be executed only when the proving device returns the correct data, that is, the code is correctly decrypted by the data K'.

Fourth Embodiment

Figure 5:
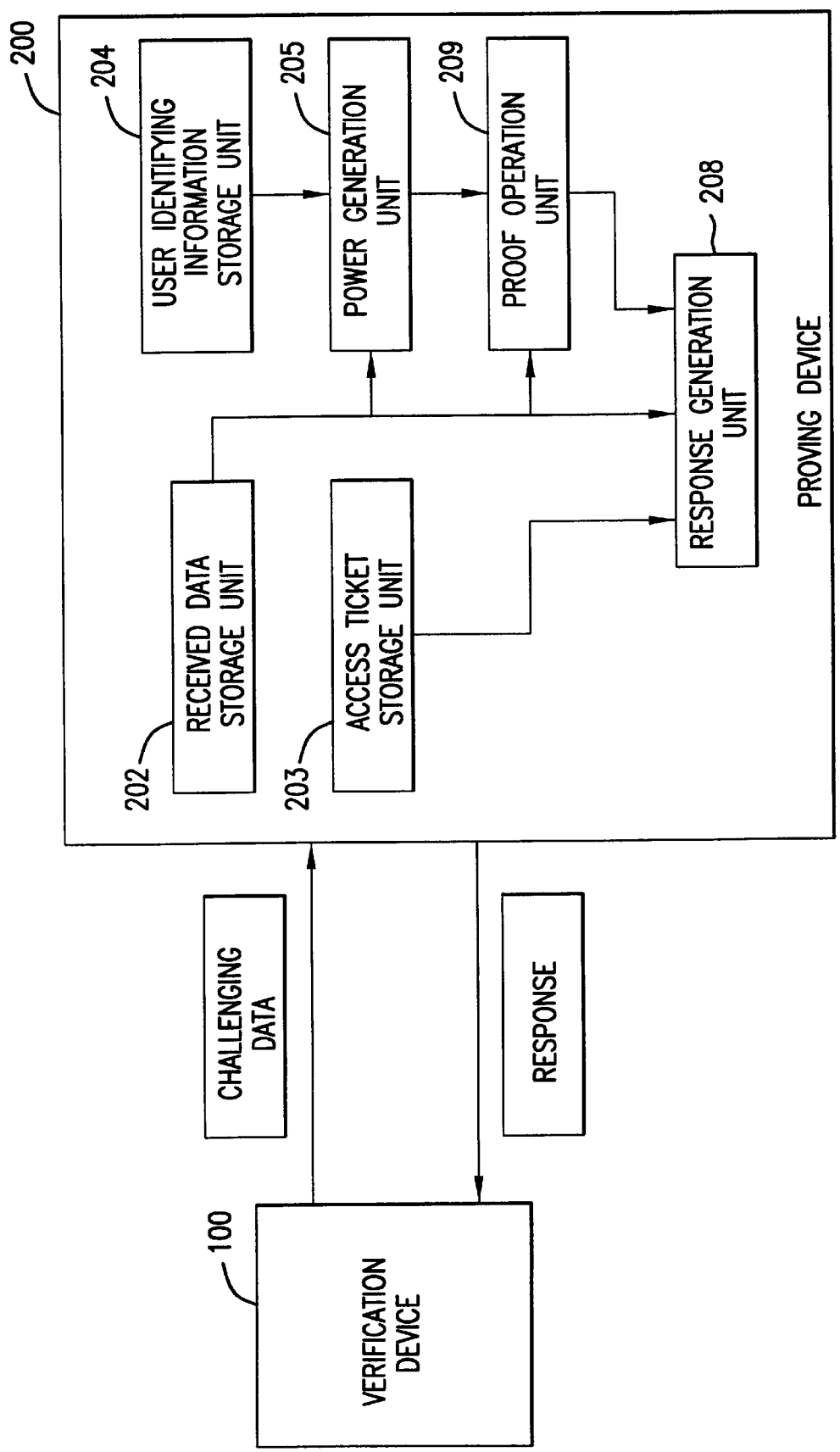
FIG. 5 is a block diagram showing a configuration of a proving device of the access right authentication apparatus in the fourth embodiment according to the present invention.
Figure 12:
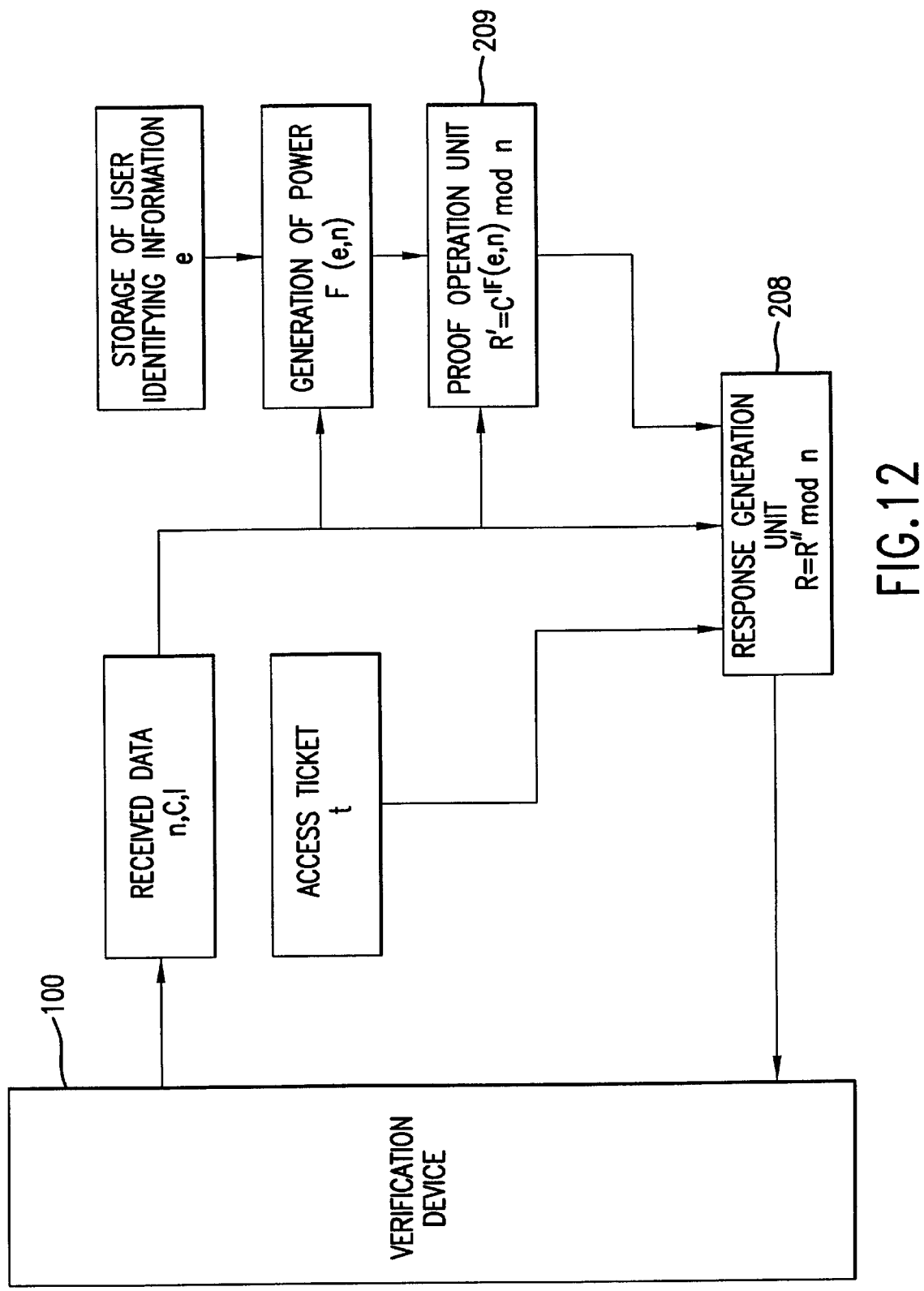
FIG. 12 illustrates operations of the proving device of the access right authentication apparatus in the fourth embodiment according to the present invention.
Figure 13:
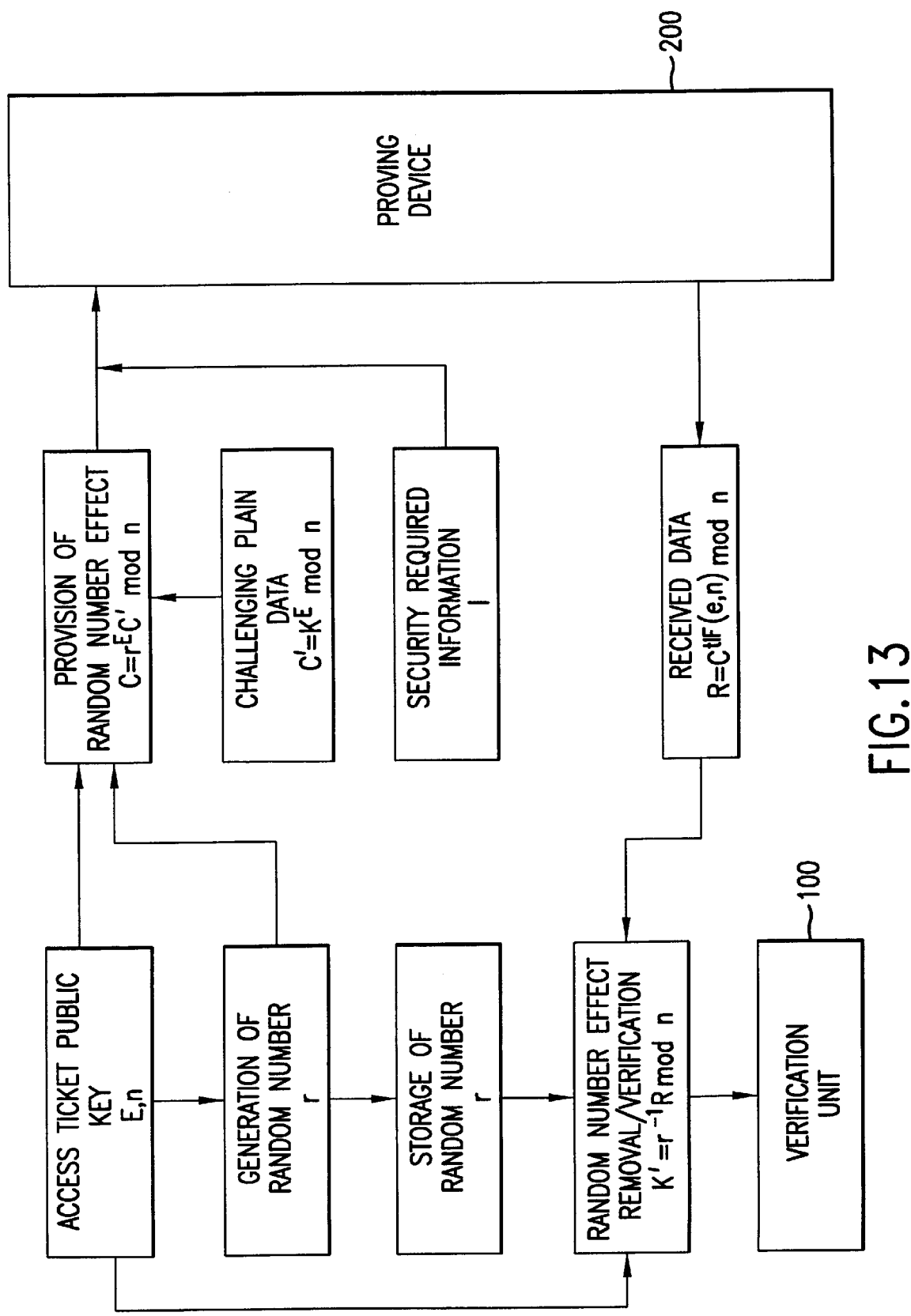
FIG. 13 illustrates operations of the verification device of the access right authentication apparatus in the fourth embodiment according to the present invention.

The fourth embodiment differs from the third embodiment in the method of calculation of the access ticket t. FIGS. 8 and 5 show the configurations of the verification device and the proving device, respectively, of the fourth embodiment. FIGS. 13 and 12 show the operations of the verification device and the proving device, respectively. The characteristics of security characteristic information D, public information E, n and security required information I and methods of generation of challenging plain data C' and challenging data C are the same as those of the first embodiment. In FIG. 5, devices or units corresponding to those in FIG. 4 have the same reference numbers as those in FIG. 4.

An access ticket t of the fourth embodiment is generated according to the following expression (31).

$$t = D/F(e, n) \bmod \phi(n) \quad (31)$$

The operations of the fourth embodiment are now described.

1. When a user accesses a verification device 100, it is invoked. Similar to the case of the third embodiment, the verification device 100 can be implemented as an application program running on a PC or workstation of a user, a server program running on a server connected to a PC or workstation of a user through a network or an exclusive device such as an IC card reader-writer. The same is true of the following embodiments.

2. The verification device 100 transmits challenging data C, a modulus n stored in an access ticket public key storage unit 103 and security required information I stored in a security required information storage unit 109. They are written in a received data storage unit 202 in a proving device 200.

3. A power generation unit 205 obtains user identifying information e stored in a user identifying information storage unit 204 and the modulus n stored in the access ticket public key storage unit 203 and calculates the following expression (32).

$$F(e, n) \quad (32)$$

4. A proof operation unit 209 in the proving device 200 obtains the security required information I and the modulus n stored in the received data storage unit 202. The proof operation unit 209 calculates the following expression (33) using the security required information I, the modulus n and the data generated by the power generation unit 205 to obtain R'.

$$R' = C^{I/F(e,\ n)} \bmod n \quad (33)$$

5. A response generation unit 208 in the proving device 200 obtains an access ticket t stored in the access ticket storage unit 203, the modulus stored in the received data storage unit 202 and R' from the proof operation unit 209 and calculates the following expression (34) based thereon to obtain R.

$$R = R'^t \bmod n \quad (34)$$

6. The proving device 200 writes R in the received data storage unit 110 in the verification device 100.

7. A random number effect removal unit 106 in the verification device 100 takes a random number r previously generated out of a random number storage unit 105 and calculates the following expression (35).

$$K' = r^{-1}R \bmod n \quad (35)$$

8. Only when the combination of the access ticket t used in the proving device 200, the user identifying information e and the security required information I is legitimate, K' obtained as a result of calculation and the challenging data K are coincident with each other. Thus, the verification is correctly conducted. In other words, if the above procedures are correctly conducted, it is confirmed that K and K' are coincide with each other according to the following expression (36).

$$K' = r^{-1}R = r^{-1}R^n = r^{-1}C^{IF(e, n)i} = r^{-1}C^{IF(e, n)D/F(e, n)} = r^{-1}C^{ID} = r^{-1}(r^E C')^{ID} = r^{-1}(r^E K^E)^{ID} = r^{-1}rK = K \bmod n \quad (36)$$

If an intruder intercepting the communication between the verification device 100 and the proving device 200 substitutes the security required information I for I', K and K' do not coincide with each other. Therefore, it is impossible for the intruder to access the services or digital data.

However, if the security required information I is not a prime number, a problem occurs. If factorization I=a*b is possible, though $C^a$ mod n and b are transmitted to the decryption device instead of C and I, the decryption device provides the same output. Accordingly, normal access is available by transmitting false information b instead of the security required information I. To avoid this problem, the combination of E, D and I should be determined so that I is a prime number.

However, though I is a prime number, if $C^I$ mod n and 1 are transmitted to the decryption device instead of C and I, the same output can be obtained from the decryption device. To avoid this problem, the proving device 200 should have means that confirm whether the transmitted information is 1. The proving device 200 is configured to perform exponentiation operation on C only when the information is not 1.

When I is not a prime number, it is effective to determine the combination of E, D and I so that I has a redundancy, for example, repetition of a specific value, and to dispose means that confirms the redundancy in the transmitted security required information in the proving device 200. If a probability that a nontrivial divisor of I has redundancy known to the proving device 200 is sufficiently low, the attack of transmitting the divisor to the decryption device instead of the security required information can be avoided by this method.

To compare K' with the verification data K, the method same as that used in the third embodiment is available.

In this embodiment, the user identifying information storage unit 204, the power generation unit 205 and the proof operation unit 209 are disposed in the inside of the IC card or the like, which any user cannot access or tamper with. It is then possible to guard the embodiment from illegitimate use enabled by leaking the user identifying information or tampering with the power generation unit 205 or the proof operation unit 209.

It may be possible to add an operation unit that performs the one-way hash function V(x, y) to the proving device 200 of the present embodiment and to calculate the following expression (37) instead of the expression (33).

$$R' = C^{v(I, n)F(e, n)} \bmod n \quad (37)$$

In this case, the encryption key E, the security required information I and the security characteristic information D are set to satisfy the following expression (38).

$$EV(I, n)D = 1 \bmod \phi(n) \quad (38)$$

With this configuration, the one-way hash function V(x, y) can be kept secret from the user and the security required information larger than the modulus is available.

If the configuration of the proving device 200 is changed to calculate the security characteristic information based on the access ticket and the output of the power generation unit 205 and to perform the exponentiation operation on the challenging data using the result of calculation, the same effect as this embodiment is available.

Fifth Embodiment

Figure 6:
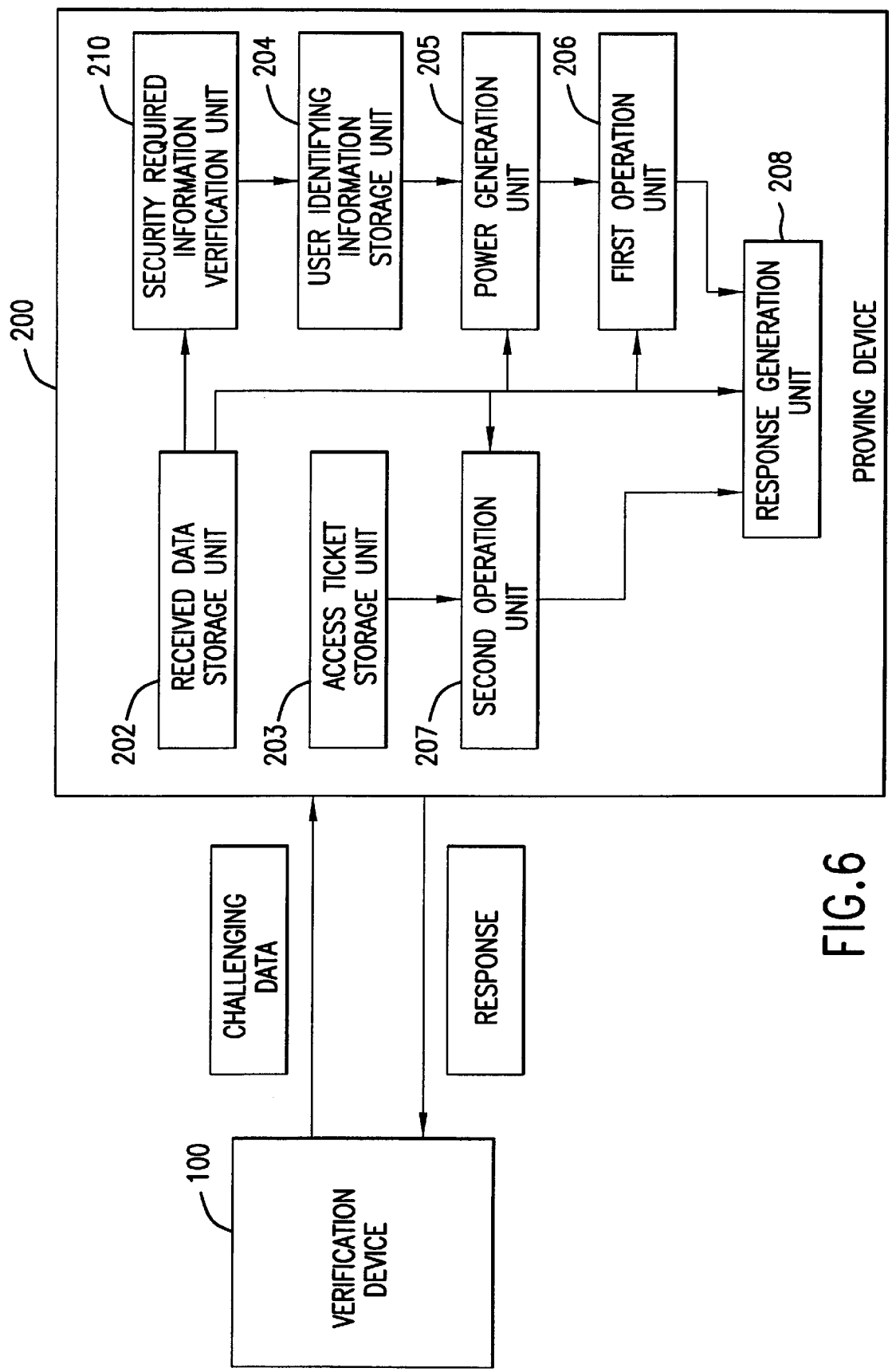
FIG. 6 is a block diagram showing a configuration of a proving device of the access right authentication apparatus in the fifth embodiment according to the present invention.
Figure 9:
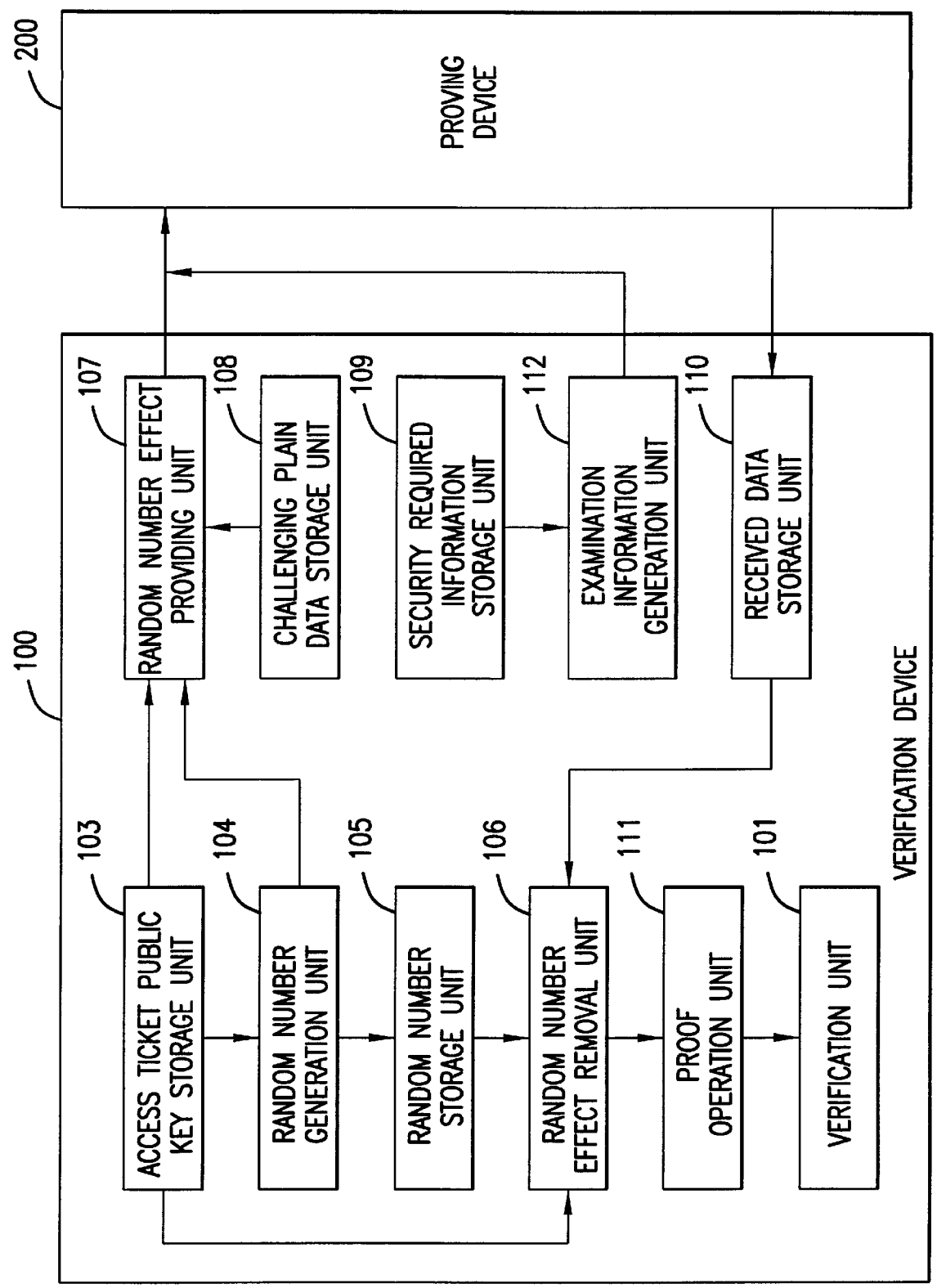
FIG. 9 is a block diagram showing a configuration of a verification device of the access right authentication apparatus in the fifth embodiment according to the present invention.
Figure 14:
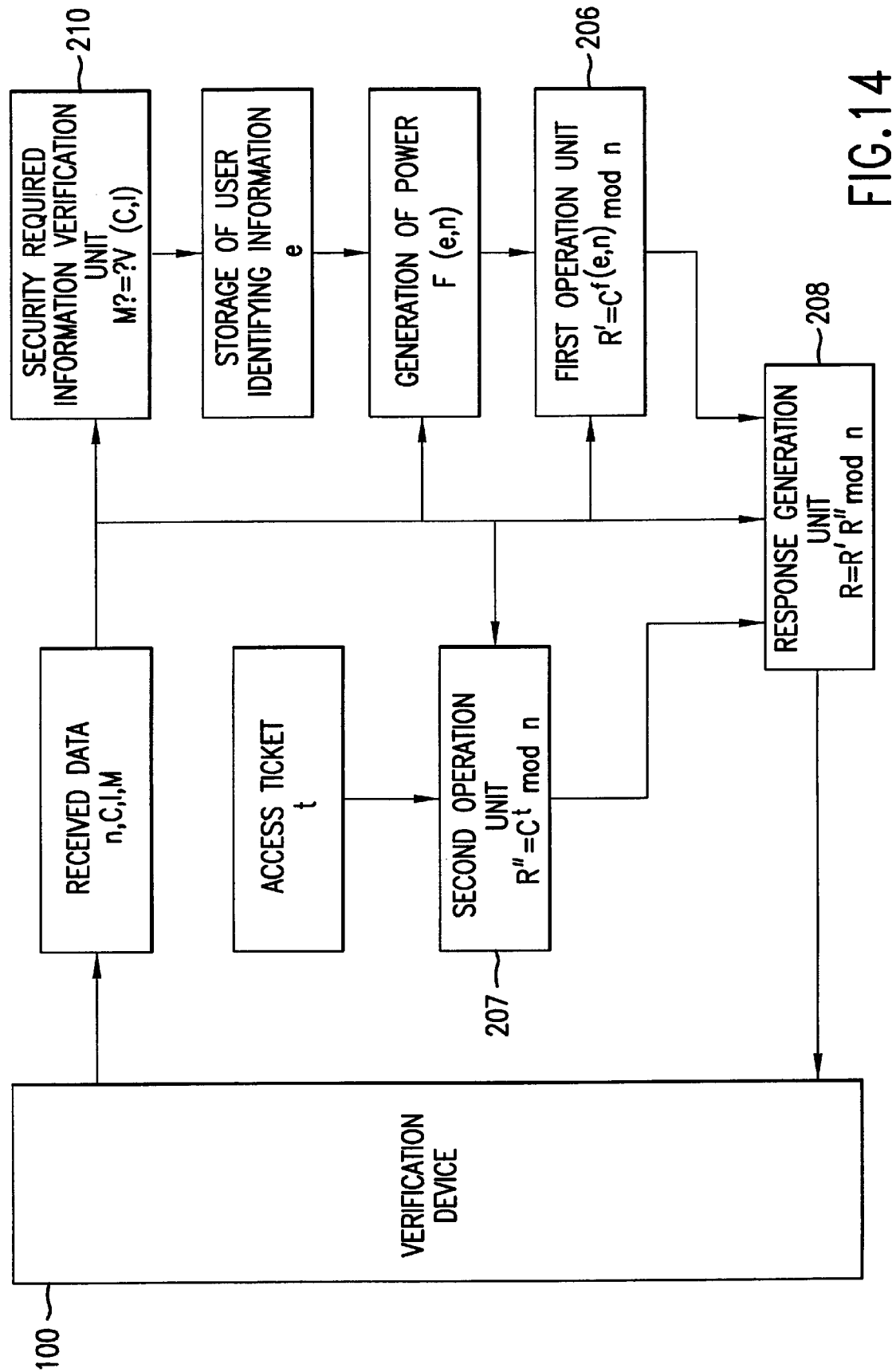
FIG. 14 illustrates operations of the proving device of the access right authentication apparatus in the fifth embodiment according to the present invention.
Figure 15:
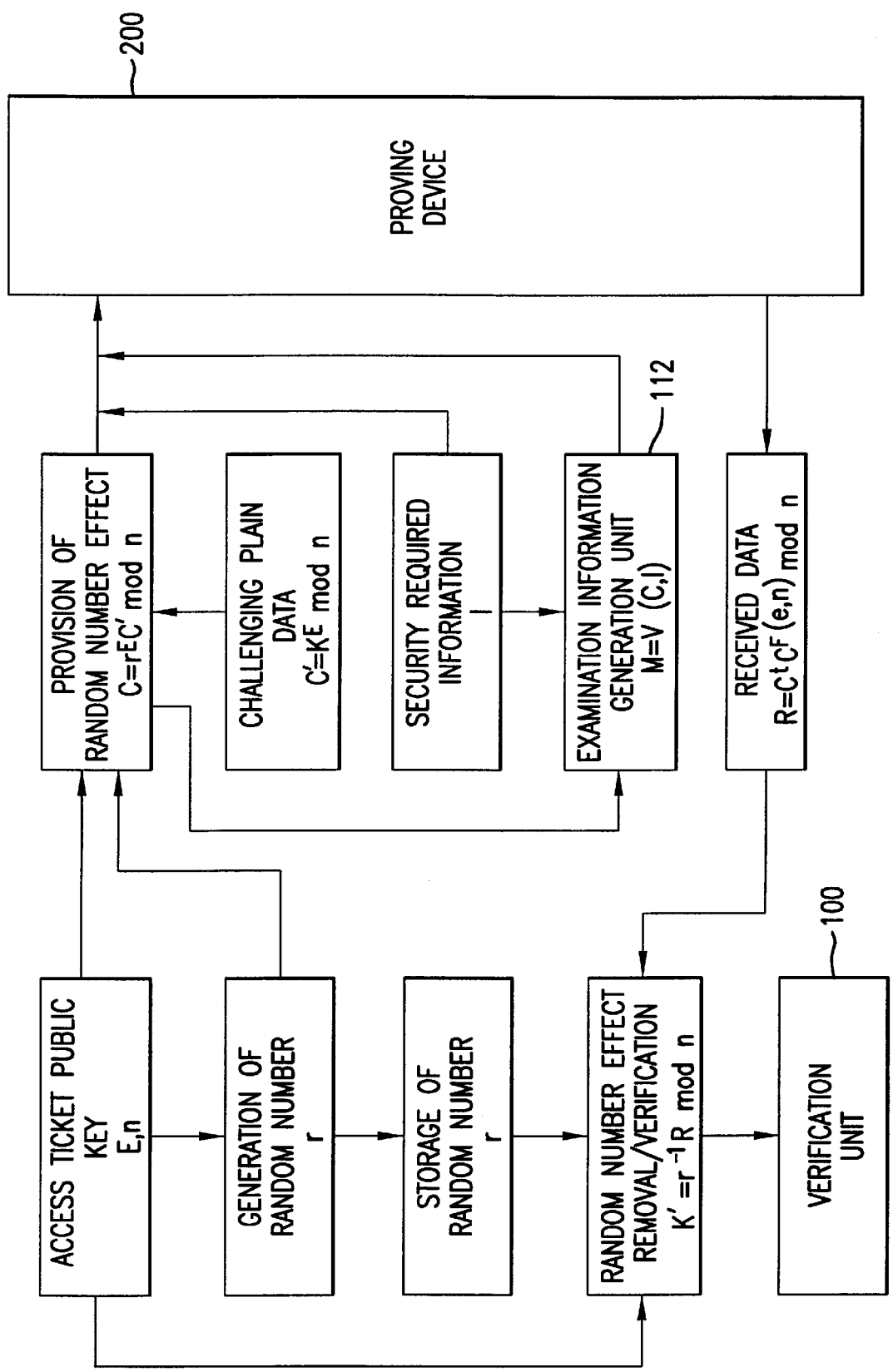
FIG. 15 illustrates operations of the verification device of the access right authentication apparatus in the fifth embodiment according to the present invention.

In the third and fourth embodiments, the proving device 200 cannot confirm the legitimacy of the security required information. In the fifth embodiment, a proving device 200 confirms the legitimacy of security required information. If the information is illegitimate, the proving device 200 does not generate a response. FIGS. 9 and 6 show configurations of a verification device 100 and the proving device 200, respectively, of the fifth embodiment. FIGS. 15 and 14 show operations of the verification device 100 and the proving device 200, respectively.

In this embodiment, characteristics of security characteristic information D, an RSA modulus n and $\phi(n)$, an Euler number of n, are same as those of the third embodiment. Challenging plain data C' and challenging data C are generated in the same way as the third embodiment. Public information E is generated to satisfy the following expression (39).

$$ED \bmod \phi(n) = 1 \quad (39)$$

Similar to the first embodiment, an access ticket t is generated based on an access ticket private key D, user identifying information e, a modulus n and a function F according to the following expression (40).

$$t = D - F(e, n) \quad (40)$$

Operations of this embodiment are now described.

1. When a user accesses a verification device 100, it is invoked.

2. An examination information generation unit 112 in the verification device 100 obtains the challenging data C and security required information I stored in the security required information storage unit 109 and calculates the following expression (41) based thereon to generate examination information M.

$$M = V(C, I) \quad (41)$$

The function V has the same characteristics as the function F. It is necessary to keep it secret from everything but the verification device 100 and the proving device 200.

3. The verification device 100 transmits the challenging data C, the modulus n stored in the access ticket public key storage unit 103, the security required information I stored in the security required information storage unit 109 and the examination information M to the proving device 200. They are written in the received data storage unit 202 of the proving device 200.

4. A security required information verification unit 210 of the proving device 200 obtains the challenging data C, the security required information I and the examination information M written in the received data storage unit 202 and verifies whether the values satisfy the following expression (42).

$$M = V(C, I) \quad (42)$$

If the values satisfy the expression (42), the following process is executed.

5. A power generation unit 205 of the proving device 200 obtains the user identifying information e stored in the user identifying information storage unit 204 and the modulus n stored in the received data storage unit 202 and calculates the following expression (43).

$$F(e, n) \quad (43)$$

6. A first operation unit 206 of the proving device 200 calculates the following expression (44) to obtain R' using the challenging data C and the modulus n written in the received data storage unit 202 and the data generated by the power generation unit 205.

$$R'=C^{F(e, n)} \bmod n \quad (44)$$

7. A second operation unit 207 of the proving device 200 obtains the access ticket t stored in the access ticket storage unit 203, the challenging data C and the modulus n stored in the received data storage unit 202 and calculates the following expression (45) to obtain R".

$$R''=C^t \bmod n \quad (45)$$

8. A response generation unit 208 of the proving device 200 obtains R' and R" from the first operation unit 206 and the second operation unit 207, respectively, and calculates the following expression (46) to obtain R.

$$R=R'R'' \bmod n \quad (46)$$

9. The proving device transmits R to the verification device 100 and it is written in the received data storage unit 110.

10. A random number effect removal unit 106 of the verification device 100 takes a random number r previously generated out of the random number storage unit 105 and calculates the following expression (47).

$$K'=r^{-1}R \bmod n \quad (47)$$

11. If the combination of the access ticket t, user identifying information e and the security required information I is correct, the data K' obtained as a result of calculation coincide with the verification data K. Thus, the verification is correctly executed.

If the above procedures are correctly executed, K' and K coincide with each other as shown by the following expression (48).

$$R'=r^{-1}R=r^{-1}R'R''=r^{-1}C^{F(e, n)}C^t=r^{-1}C^D=r^{-1}(r^EC')D=r^{-1}(r^EK^E)^D=r^{-1}rK=K \bmod n \quad (48)$$

If an intruder intercepting the communication between the verification device 100 and the proving device 200 substitutes the security required information I for I', it is detected by the examination in step 4. The proving device 200 then halts generation of the response and informs the verification device 100 of the halt. Several ways of informing the halt are available. For example, halt code can be written in the received data storage unit 110. An alternative is to determine the time necessary to generate the response in advance and to halt the process if no response is written by the predetermined time.

To compare K' and the verification data K, the method same as that of the third embodiment can be applied.

In this embodiment, the user identifying information storage unit 204, the security required information verification unit 210, the power generation unit 205 and the first operation unit 206 can be disposed in the inside of the IC card or the like, which any user cannot access or tamper with. It is then possible to guard the embodiment from an illegitimate use enabled by leaking the user identifying information or tampering with the power generation unit 205 or the first operation unit 206.

Sixth Embodiment

Figure 7:
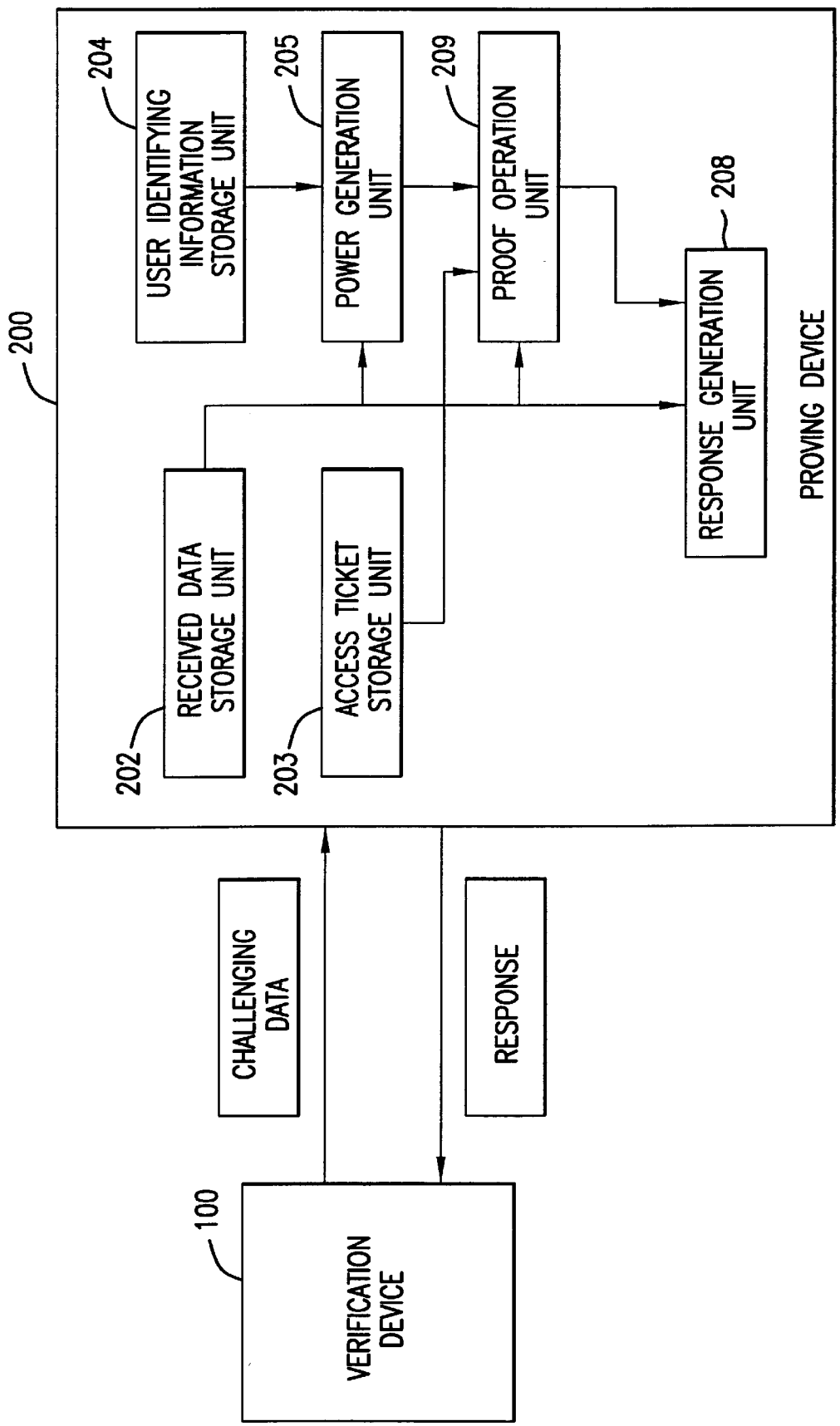
FIG. 7 is a block diagram showing a configuration of a proving device of the access right authentication apparatus in the sixth embodiment according to the present invention.
Figure 16:
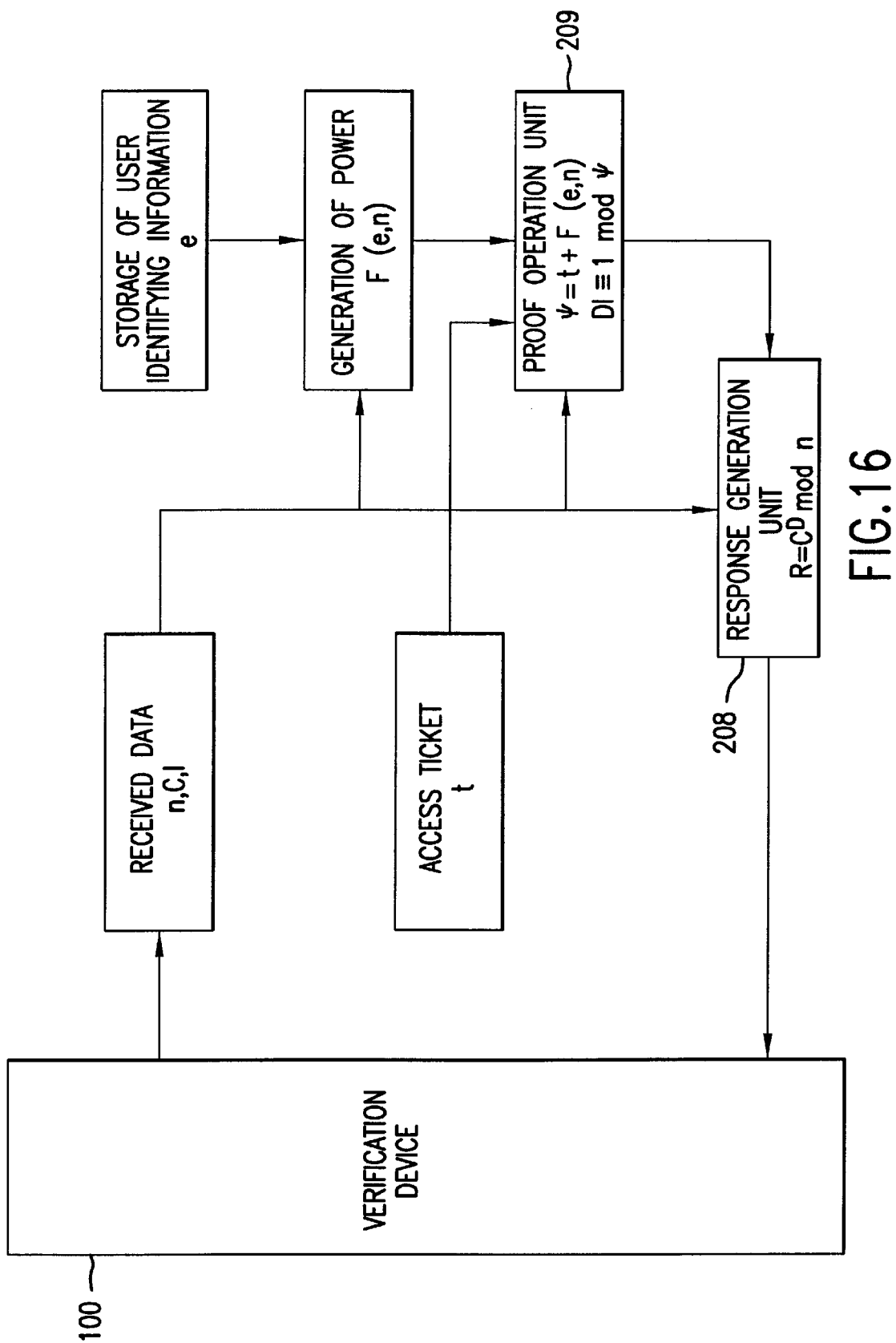
FIG. 16 illustrates operations of the proving device of the access right authentication apparatus in the sixth embodiment according to the present invention.
Figure 17:
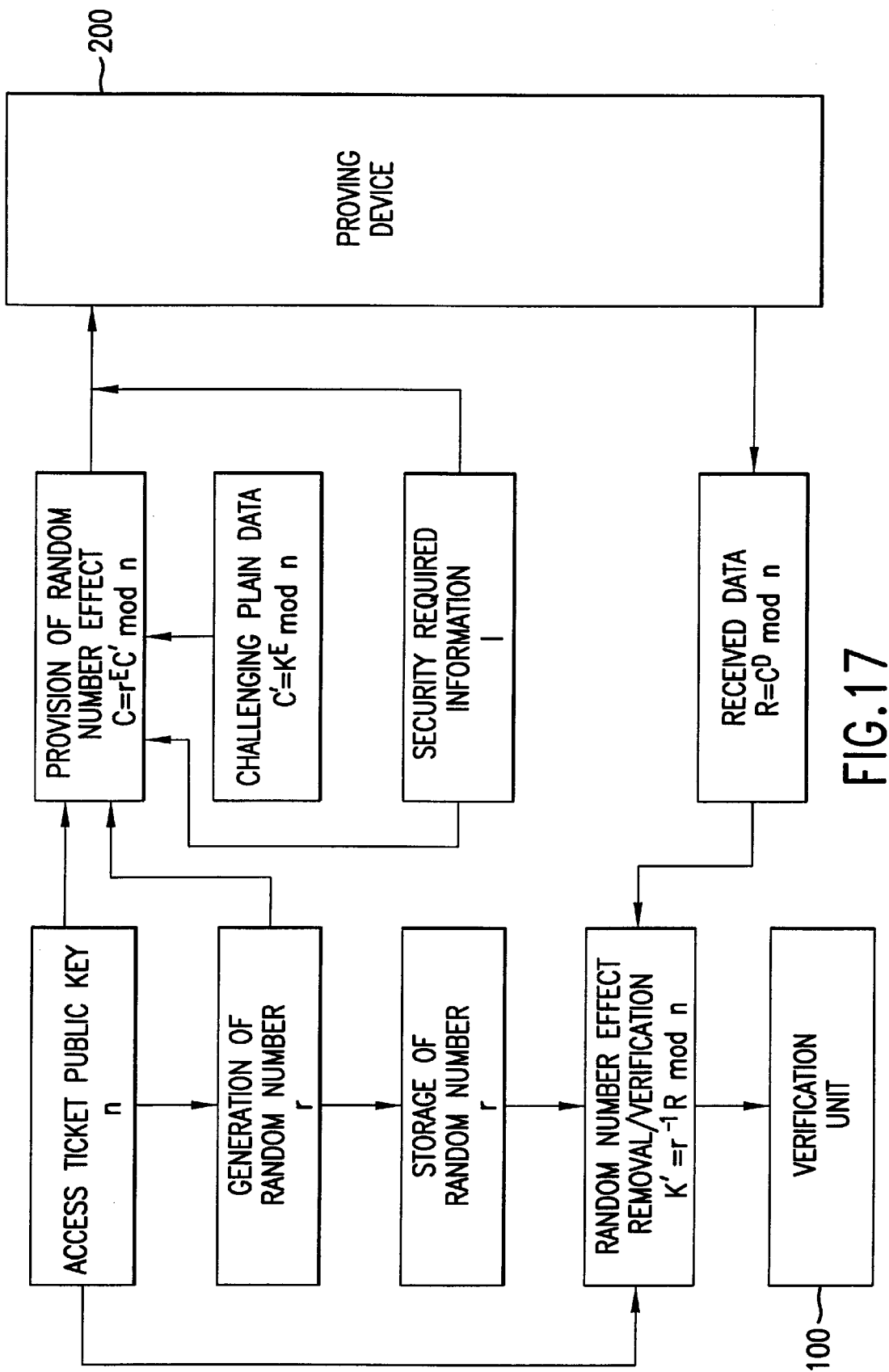
FIG. 17 illustrates operations of the verification device of the access right authentication apparatus in the sixth embodiment according to the present invention.

Configurations of a verification device 100 and a proving device 200 of the sixth embodiment are shown in FIGS. 8 and 7, respectively. Operations of the verification device 100 and the proving device 200 are shown in FIGS. 17 and 16, respectively. In this embodiment, public information (RSA modulus) n and $\phi(n)$, an Euler number of n, satisfy the same characteristics as those of the first embodiment. Security required information I is an integer that satisfies the following expression (49).

$$\gcd(I, \phi(n))=1 \quad (49)$$

An access ticket t is generated according to the following expression (50) using the Euler number $\phi(n)$, user identifying information e, the modulus n and a function F.

$$t=\phi(n)-F(e, n) \quad (50)$$

Operations of this embodiment are now described.

1. A user accesses the verification device 100 and it is invoked.

2. The verification device 100 transmits challenging data C, the modulus n stored in the access ticket public key storage unit 103 and the security required information I stored in the security required information storage unit 109 to the proving device 200. They are written in the received data storage unit 202. A challenging plain data storing unit 108 stores C' as challenging plain data. If arbitrary data K is assumed to be verification data, the challenging plain data C' and the data K satisfy the following expression (51).

$$C'=K^I \bmod n \quad (51)$$

A random number generation unit 104 of the verification device 100 generates a random number r. A random number effect providing unit 107 calculates the following expression (52) using r, n obtained from the access ticket public key storage unit 103, I obtained from the security required information storage unit 108 and C' obtained from the challenging plain data storage unit 108 to generate the challenging data C. The generated challenging data C is written in the received data storage unit 202 of the proving device 200. The generated random number r is stored in a random number storage unit 105.

$$C=r^IC' \bmod n \quad (52)$$

3. The power generation unit 205 of the proving device 200 obtains the user identifying information e stored in the user identifying information storage unit 204 and the modulus n stored in the received data storage unit 202 and calculates the following expression (53).

$$F(e, n) \quad (53)$$

4. The proof operation unit 209 of the proving device 200 obtains the security required information I stored in the received data storage unit 202 and the access ticket t stored in the access ticket storage unit 203. The proof operation unit 209 then calculates the following expression (54) using the security required information I, the access ticket t and the data generated by the power generation unit 205.

$$\phi=t+F(e, n) \quad (54)$$

After that, the proof operation unit 209 calculates D that satisfies the following expression (55).

$$DI = 1 \mod \phi \quad (55)$$

5. A response generation unit 208 of the proving device 200 obtains D from the proof operation unit 209, C and n from the received data storage unit 202 and calculates the following expression (56) to obtain R.

$$R = C^D \mod n \quad (56)$$

6. The random number effect removal unit 106 of the verification device 100 obtains a random number r that was previously generated from the random number storage unit 105 and calculates the following expression (57).

$$K' = r^{-1} R \mod n \quad (57)$$

7. Only when the combination of the access ticket t, the user identifying information e and the security required information I used in the proving device 200 is legitimate, K' obtained as a result of calculation and the verification data K coincide with each other. Thus, the verification is correctly performed.

If the above procedures are correctly executed, coincidence between K and K' can be confirmed according to the following expression (58).

$$K' = r^{-1} R = r^{-1} C^D = r^{-1} (r'C')^D = r^{-1} (r'K^I)^D = r^{-1} rk \; (\because \phi(n) = t + F(e, n)) = K \mod n \quad (58)$$

If an intruder who intercepts the communication between the verification device 100 and the proving device 200 substitutes the security required information I for I', calculation cannot be succeeded.

$$I'D \; 1 \mod \phi(n)$$

In this case, K and K' do not coincide with each other. Therefore, the services or digital data cannot be accessed. To compare K' and the verification data K, the method same as that of the third embodiment can be used.

In this embodiment, the user identifying information storage unit 204, the power generation unit 205, the proof operation unit 209 and the response generation unit 208 can be disposed in the inside of the IC card or the like, which any user cannot access or tamper with. It is then possible to guard the embodiment from an illegitimate use enabled by leaking the user identifying information or tampering with the power generation unit 205 or the proof operation unit 209.

It may be possible to add an operation unit that performs the one-way hash function V(x, y) to the proving device 200 of the present embodiment and to calculate the following expression (59) instead of the expression (55).

$$DV(I, n) = 1 \mod n \quad (59)$$

If arbitrary data K is assumed to be verification data, the challenging plain data C' and the data K satisfy the following expression (60).

$$C' = K^{I(I, n)} \mod n \quad (60)$$

With this configuration, the security required information larger than the modulus is available.

What is claimed is:

1. A decryption device that decrypts a cipher text encrypted by RSA method, comprising:
    a first storage unit that stores a modulus n of a modulus exponentiation operation;
    a second storage unit that stores first decryption information $d_1$;
    a cipher text input unit that inputs a cipher text C;
    an information input unit that inputs second decryption information $d_2$; and
    an operation unit that performs the modulus exponentiation operation in which C is raised to a power, a product of $d_1$ and $d_2$, modulo n and outputs a result of the operation.

2. The decryption device as set forth in claim 1, further comprising:
    a confirmation unit that confirms a value of $d_2$, wherein the operation unit does not perform the exponentiation operation when $d_2$ is 1.

3. The decryption device as set forth in claim 1, further comprising:
    a confirmation unit that confirms whether $d_2$ includes predetermined redundancy, wherein the operation unit does not perform the exponentiation operation when $d_2$ does not include the predetermined redundancy.

4. A decryption device that decrypts a cipher text encrypted by RSA method, comprising:
    a first storage unit that stores a modulus n of a modulus exponentiation operation;
    a second storage unit that stores first decryption information $d_1$;
    a cipher text input unit that inputs a cipher text C;
    an information input unit that inputs second decryption information $d_2$; and
    an operation unit that performs the modulus exponentiation operation in which C is raised to a power, a product of $d_1$ and a result of a predetermined operation on $d_2$, modulo n and outputs a result of the operation.

5. A decryption device that decrypts a cipher text encrypted by RSA method, comprising:
    a first storage unit that stores a modulus n of a modulus exponentiation operation;
    a second storage unit that stores an Euler number of n ($\phi(n)$);
    a cipher text input unit that inputs a cipher text C;
    an information input unit that inputs decryption information d;
    a first operation unit that calculates an inverse number of d modulo $\phi(n)$; and
    a second operation unit that performs the modulus exponentiation operation in which C is raised to a power, a result of operation by the first operation unit, modulo n and outputs a result of the operation.

6. A decryption device that decrypts a cipher text encrypted by RSA method, comprising:
    a first storage unit that stores a modulus n of a modulus exponentiation operation;
    a first operation unit that calculates an Euler number of n ($\phi(n)$);
    a cipher text input unit that inputs a cipher text C;
    an information input unit that inputs decryption information d;
    a second operation unit that calculates an inverse number of d modulo $\phi(n)$; and
    a third operation unit that performs the modulus exponentiation operation in which C is raised to a power, a result of operation by the second operation unit, modulo n and outputs a result of the operation.

7. A decryption device that decrypts a cipher text encrypted by RSA method, comprising:

a first storage unit that stores a modulus n of a modulus exponentiation operation;

a second storage unit that stores an Euler number of n ($\phi(n)$);

a cipher text input unit that inputs a cipher text C;

an information input unit that inputs decryption information d;

a first operation unit that calculates an inverse number of a result of a predetermined operation on d modulo $\phi(n)$; and a second operation unit that performs the modulus exponentiation operation in which C is raised to a power, a result of the operation by the first operation unit, modulo n and outputs a result of the operation.

8. A decryption device comprising:

a storage unit that stores at least a piece of secret decryption information kept secret to the decryption device;

a cipher text input unit that inputs a cipher text C;

an information input unit that inputs at least a piece of open decryption information disclosed to the decryption device; and a decryption unit that decrypts C based on the secret decryption information and the open decryption information.

9. A decryption method comprising the steps of:

storing at least a piece of secret decryption information kept secret to a decryption device;

inputting a cipher text C;

inputting at least a piece of open decryption information disclosed to the decryption device; and decrypting C based on the secret decryption information and the open decryption information.

10. A key generation device for an encryption method adopting a modulus exponentiation operation using an integer as a modulus, comprising:

an operation unit that operates a non collision function;

a composite number generation unit that generates a composite number; and a key generation unit that generates keys I, D and E used in the encryption method so that a product of D, E and a result of operation of the non collision function on I is congruent with 1 modulo an Euler number of the composite number.

11. A key generation device for an encryption method adopting a modulus exponentiation operation using an integer as a modulus, comprising:

a key generation unit that generates keys I, D and E used in the encryption method; and a composite number generation unit that generates a composite number, wherein I is a prime number and a product of I, D and E is congruent with 1 modulo an Euler number of the composite number.

12. A key generation device for an encryption method adopting a modulus exponentiation operation using an integer as a modulus, comprising:

a redundancy providing unit that provides predetermined redundancy to a specific piece of information;

a composite number generation unit that generates a composite number; and a key generation unit that generates keys I, D and E used in the encryption method, wherein I is generated by providing the predetermined redundancy to the specific piece of information by the redundancy providing unit and a product of I, D and E is congruent with 1 modulo an Euler number of the composite number.

13. An access right authentication apparatus that authenticates an access right of a user by verifying legitimacy of a response generated for proving the access right of the user, comprising:

a first storage unit that stores challenging data;

a second storage unit that stores user identifying information;

a third storage unit that stores proof support information that is a result of a predetermined operation on security characteristic information and the user identifying information;

a fourth storage unit that stores security required information;

a response generation unit that generates a response by performing a predetermined operation on the challenging data, the user identifying information, the proof support information and the security required information; and a response verification unit that verifies the response is generated based on the security characteristic information and the security required information.

14. The access right authentication apparatus as set forth in claim 13, wherein the response generation unit comprises a first operation unit that performs a predetermined operation on the user identifying information, the proof support information and the security required information, and a second operation unit that performs a predetermined operation on the challenging data and the result of the operation performed by the first operation unit to generate the response.

15. The access right authentication apparatus as set forth in claim 13, wherein the response generation unit comprises a first operation unit that performs a predetermined operation on the challenging data , the user identifying information and the security required information, and a second operation unit that performs a predetermined operation on the result of the operation by the first operation unit and the proof support information to generate the response.

16. The access right authentication apparatus as set forth in claim 13, wherein the response generation unit comprises a first operation unit performs a predetermined operation on the challenging data, the user identifying information and the security required information, a second operation unit that performs a predetermined operation on challenging data, the proof support information and the security required information and a third operation unit performs a predetermined operation on the results of the operations performed by the first operation unit and the second operation unit to generate the response.

17. The access right authentication apparatus as set forth in claim 13, wherein the security characteristic information is a first decryption key, the security required information is a second decryption key, the challenging data is a result of encryption of arbitrary data with an encryption key corresponding to the first and second decryption keys, and the response verification unit verifies that the response generated by the response generation unit is the correctly decrypted challenging data.

18. The access right authentication apparatus as set forth in claim 13, wherein the security characteristic information is a first decryption key, a result of a predetermined operation on the security required information is a second decryption key, the challenging data is a result of encryption of arbitrary data with an encryption key corresponding to the first and second decryption keys, and the response verification unit verifies that the response generated by the response generation unit is the correctly decrypted challenging data.

19. The access right authentication apparatus as set forth in claim 13, wherein a function used for encryption/decryption is a modulus exponentiation operation using an integer n as a modulus, the security characteristic information is an Euler number of the integer n, the security required information is an encryption key, the challenging data is a result of encryption of arbitrary data with the encryption key, and the response verification unit verifies that the response generated by the response generation unit is the correctly decrypted challenging data.

20. The access right authentication apparatus as set forth in claim 13, wherein a function used for encryption/decryption is a modulus exponentiation operation using an integer n as a modulus, the security characteristic information is an Euler number of the integer n, a result of a predetermined operation on the security required information is an encryption key, the challenging data is arbitrary data encrypted with the encryption key, and the response verification unit verifies that the response generated by the response generation unit is the correctly decrypted challenging data.

21. The access right authentication apparatus as set forth in claim 14, further comprising:
a secure unit that holds the second storage unit, first operation unit and the second operation unit to make it difficult to observe them from the outside of the secure unit.

22. The access right authentication apparatus as set forth in claim 15, further comprising:
a secure unit that holds the second storage unit and the first operation unit to make it difficult to observe them from the outside of the secure unit.

23. The access right authentication apparatus as set forth in claim 16, further comprising:
a secure unit that holds the second storage unit and the first operation unit to make it difficult to observe them from the outside of the secure unit.

24. The access right authentication apparatus as set forth in claim 17, wherein a function used for encryption/decryption is a modulus exponentiation operation using an integer n as a modulus, and a product of the first decryption key, the second decryption key and the encryption key is congruent with 1 modulo an Euler number of n.

25. The access right authentication apparatus as set forth in claim 17, further comprising:
a random number generation unit that generates a random number; and
a random number storage unit that stores the random number, wherein the challenging data is generated by providing a random number effect using the random number to data encrypted with the encryption key, and the response verification unit verifies that a result of removing the random number effect from the response is correct decryption of the data that was encrypted with the encryption key.

26. The access right authentication apparatus as set forth in claim 18, wherein a function used for encryption/decryption is a modulus exponentiation operation using an integer n as a modulus, and a product of the first decryption key, the second decryption key and the encryption key is congruent with 1 modulo an Euler number of n.

27. The access right authentication apparatus as set forth in claim 24, wherein the proof support information has a value obtained by subtracting a value generated by performing a predetermined operation on the user identifying information from a value of the first decryption key, and the response generation unit generates the response by performing the modulus exponentiation operation in which the challenging data is raised to a power, a product of the first decryption key and the second decryption key, modulo n based on the proof support information, the user identifying information, the security required information and the challenging data.

28. The access right authentication apparatus as set forth in claim 24, wherein the response generation unit has a first operation unit that performs the modulus exponentiation operation in which the challenging data is raised to a power, a product of the second decryption key and a result of a predetermined operation on the user identifying information, modulo n, a second operation unit that performs the modulus exponentiation operation in which the challenging data is raised to a power, a product of the proof support information and the second decryption key, modulo n and a third operation unit that calculates a product of results of the operations by the first operation unit and the second operation unit modulo n, and wherein the response verification unit verifies that the response generated by the response generation unit is the correctly decrypted challenging data.

29. The access right authentication apparatus as set forth in claim 24, wherein the proof support information stored in the third storage unit has a value obtained by dividing the first decryption key by a value generated by performing a predetermined operation on the user identifying information modulo the Euler number of n, and the response generation unit generates the response by performing the modulus exponentiation operation in which the challenging data is raised to a power, a product of the first decryption key and the second decryption key, modulo n based on the proof support information, the user identifying information, the security required information and the challenging data.

30. The access right authentication apparatus as set forth in claim 24, wherein the response generation unit has a first operation unit that performs the modulus exponentiation operation in which the challenging data is raised to a power, a product of the second decryption key and a result of a predetermined operation on the user identifying information, modulo n, and a second operation unit that performs the modulus exponentiation operation in which a result of the operation by the first operation unit is raised to a power, the proof support information, modulo n, and wherein the response verification unit verifies that the response generated by the response generation unit is the correctly decrypted challenging data.

31. The access right authentication apparatus as set forth in claim 26, wherein the proof support information has a value obtained by subtracting a value generated by performing a predetermined operation on the user identifying information from a value of the first decryption key, and the response generation unit generates the response by performing the modulus exponentiation operation in which the challenging data is raised to a power, a product of the first decryption key and the second decryption key, modulo n based on the proof support information, the user identifying information, the security required information and the challenging data.

32. The access right authentication apparatus as set forth in claim 26, wherein the response generation unit has a first operation unit that performs the modulus exponentiation operation in which the challenging data is raised to a power, a product of the second decryption key and a result of a predetermined operation on the user identifying information, modulo n, a second operation unit that performs the modulus exponentiation operation in which the challenging data is raised to a power, a product of the proof support information and the second decryption key, modulo n and a third operation unit that calculates a product of results of the operations by the first operation unit and the second operation unit modulo n, and wherein the response verification unit verifies that the response generated by the response generation unit is the correctly decrypted challenging data.

33. The access right authentication apparatus as set forth in claim 26, wherein the proof support information stored in the third storage unit has a value obtained by dividing the first decryption key by a value generated by performing a predetermined operation on the user identifying information modulo the Euler number of n, and the response generation unit generates the response by performing the modulus exponentiation operation in which the challenging data is raised to a power, a product of the first decryption key and the second decryption key, modulo n based on the proof support information, the user identifying information, the security required information and the challenging data.

34. The access right authentication apparatus as set forth in claim 26, wherein the response generation unit has a first operation unit that performs the modulus exponentiation operation in which the challenging data is raised to a power, a product of the second decryption key and a result of a predetermined operation on the user identifying information, modulo n, and a second operation unit that performs the modulus exponentiation operation in which a result of the operation by the first operation unit is raised to a power, the proof support information, modulo n, and wherein the response verification unit verifies that the response generated by the response generation unit is the correctly decrypted challenging data.

35. The access right authentication apparatus as set forth in claim 19, wherein the proof support information is generated by performing a predetermined operation on the Euler number and the user identifying information, and wherein the response generation unit calculates a decryption key corresponding to the encryption key based on the proof support information, the user identifying information and the security required information and generates the response by performing the modulus exponentiation operation in which the challenging data is raised to a power, the decryption key, modulo n.

36. The access right authentication apparatus as set forth in claim 20, wherein the proof support information is generated by performing a predetermined operation on the Euler number and the user identifying information, and wherein the response generation unit calculates a decryption key corresponding to the encryption key based on the proof support information, the user identifying information and the security required information and generates the response by performing the modulus exponentiation operation in which the challenging data is raised to a power, the decryption key, modulo n.

37. An access right authentication apparatus that authenticates a user's access right by verifying legitimacy of a response generated for proving the user's access right, comprising:
   a first storage unit that stores challenging data;
   a second storage unit that stores user identifying information;
   a third storage unit that stores proof support information generated by performing a first predetermined operation on security characteristic information and the user identifying information;
   a fourth storage unit that stores security required information;
   a fifth storage unit that stores security examination information;
   an examination unit that examines whether the security examination information has a specific relationship with a result of a second predetermined operation on the challenging data and the security required information;
   a response generation unit, when the examination unit determines that the security examination information has the specific relationship with the result of the second predetermined operation, that generates a response by performing a third predetermined operation on the challenging data, the user identifying information and the proof support information; and
   a response verification unit that verifies the response is generated based on the security characteristic information.

38. An access right authentication method for authenticating a user's access right by verifying legitimacy of a response generated for proving the user's access right, comprising the steps of:
   storing challenging data,
   storing user identifying information;
   storing proof support information generated by performing a predetermined operation on security characteristic information and the user identifying information;
   storing security required information;
   generating a response by performing a predetermined operation on the challenging data, the user identifying information, the proof support information and the security required information; and
   verifying that the response is generated based on the security characteristic information and the security required information.

39. An access right authentication method for authenticating a user's access right by verifying legitimacy of a response generated for proving the user's access right, comprising the steps of:
   storing challenging data,
   storing user identifying information;
   storing proof support information generated by performing a first predetermined operation on security characteristic information and the user identifying information;
   storing security required information;
   storing security examination information;
   examining whether the security examination information has a specific relationship with a result of a second predetermined operation on the challenging data and the security required information;
   when it is determined that the security examination information has the specific relationship with the result of the second predetermined operation in the examining step, generating a response by performing a third predetermined operation on the challenging data, the user identifying information and the proof support information; and
   verifying that the response is generated based on the security characteristic information.

* * * * *